United States Patent
Theodore et al.

(10) Patent No.: US 9,084,962 B2
(45) Date of Patent: Jul. 21, 2015

(54) FLUID SEPARATION ASSEMBLY AND METHOD

(75) Inventors: Brent Kenneth Theodore, Rossmoor, CA (US); Donald Ray Snow, Jr., Fountain Valley, CA (US); James P. Huang, Irvine, CA (US); Michael J. Robinson, Huntington Beach, CA (US); Ivana Jojic, Bellevue, WA (US); Benjamin Bikson, Newton, MA (US)

(73) Assignee: The Boeing Company, Chicago, IL (US)

( * ) Notice: Subject to any disclaimer, the term of this patent is extended or adjusted under 35 U.S.C. 154(b) by 552 days.

(21) Appl. No.: 13/411,548

(22) Filed: Mar. 3, 2012

(65) Prior Publication Data

US 2012/0312162 A1 Dec. 13, 2012

Related U.S. Application Data

(60) Provisional application No. 61/494,867, filed on Jun. 8, 2011.

(51) Int. Cl.
*B01D 53/22* (2006.01)
*B01D 63/02* (2006.01)
(Continued)

(52) U.S. Cl.
CPC .......... *B01D 53/228* (2013.01); *B01D 19/0005* (2013.01); *B01D 63/02* (2013.01);
(Continued)

(58) Field of Classification Search
CPC .. B01D 53/228; B01D 63/022; B01D 63/025; B01D 37/32; B01D 19/0005; B01D 63/02
USPC ...................... 95/43, 45, 47, 54; 96/4, 7, 8, 10
See application file for complete search history.

(56) References Cited

U.S. PATENT DOCUMENTS 3,968,192 A * 7/1976 Hoffman et al. ........... 264/36.15
4,061,574 A 12/1977 Clark
(Continued)

FOREIGN PATENT DOCUMENTS

EP 0798034 A1 10/1997
EP 1108458 A1 6/2001
(Continued)

OTHER PUBLICATIONS

Federal Aviation Regulation (FAR) Part 25 Section 25.981(b) effective as of Sep. 19, 2008, "Fuel tank ignition prevention", http://www.airweb.faa.gov/Regulatory_and_Guidance_Library/rgFAR.nsf/0/339DAEE3E0A6379D862574CF00641951?OpenDocument, 3 pages.
(Continued)

*Primary Examiner* — Jason M Greene
*Assistant Examiner* — Anthony Shumate

(57) ABSTRACT

In an embodiment there is provided a fluid separation assembly. The assembly has a hollow fiber bundle with a plurality of hollow fiber membranes. The assembly further has a first tubesheet and a second tubesheet encapsulating respective ends of the hollow fiber bundle, wherein one of the tubesheets has a plurality of radial through openings formed in the tubesheet. The assembly further has a housing surrounding the hollow fiber bundle and the first and second tubesheets, the housing having a feed inlet port, a permeate outlet port, and a non-permeate outlet port. The feed gas, permeate gas, or non-permeate gas are introduced into or removed from the hollow fiber membranes via the plurality of radial through openings formed in the tubesheet, such that the radial through openings of the tubesheet intersect each or substantially each of the hollow fiber membranes.

24 Claims, 21 Drawing Sheets

(51) Int. Cl.
  *B64D 37/32* (2006.01)
  *B01D 19/00* (2006.01)

(52) U.S. Cl.
  CPC ......... *B01D 63/022* (2013.01); *B01D 63/025* (2013.01); *B64D 37/32* (2013.01); *B01D 2313/10* (2013.01); *B01D 2313/12* (2013.01); *B01D 2313/21* (2013.01); *B01D 2313/38* (2013.01); *Y02T 50/44* (2013.01)

(56) References Cited

U.S. PATENT DOCUMENTS

| | | | |
|---|---|---|---|
| 4,219,613 A * | 8/1980 | Anand et al. | 429/104 |
| 4,652,373 A | 3/1987 | Trimmer | |
| 5,013,331 A | 5/1991 | Edwards et al. | |
| 5,211,728 A | 5/1993 | Trimmer | |
| 5,282,964 A * | 2/1994 | Young et al. | 210/321.8 |
| 5,897,729 A | 4/1999 | Bikson et al. | |
| 7,152,635 B2 | 12/2006 | Moravec et al. | |
| 7,204,868 B2 | 4/2007 | Snow, Jr. | |
| 7,442,230 B2 | 10/2008 | Snow, Jr. | |
| 8,366,804 B2 * | 2/2013 | Liu et al. | 95/45 |
| 2005/0247197 A1 * | 11/2005 | Snow, Jr. | 95/138 |
| 2007/0157803 A1 * | 7/2007 | McNeil et al. | 95/45 |
| 2012/0304856 A1 * | 12/2012 | Kanetsuki et al. | 95/47 |
| 2013/0071793 A1 * | 3/2013 | Ma et al. | 431/2 |
| 2014/0053726 A1 * | 2/2014 | Evosevich et al. | 95/54 |
| 2014/0116249 A1 * | 5/2014 | Evosevich et al. | 95/47 |
| 2014/0175227 A1 * | 6/2014 | Bikson | 244/135 R |

FOREIGN PATENT DOCUMENTS

| | | |
|---|---|---|
| WO | 97/33682 A1 | 9/1997 |
| WO | 2006/079782 A2 | 8/2006 |

OTHER PUBLICATIONS

European Aviation Safety Agency Certification Specification (EASA CS) Section 25.981(b)(2)(b)(3), Amendment 6, "Fuel tank flammability", 45 pages.

Notification of Transmittal of the International Search Report and the Written Opinion of the International Searching Authority, Mailed Mar. 26, 2013, for international application PCT/US2012/041731, Applicant The Boeing Company, 17 pages.

Notification of Transmittal of the International Search Report and the Written Opinion of the International Searching Authority, Mailed Mar. 13, 2013, for counterpart application PCT/US2012/041723, Applicant The Boeing Company, 17 pages.

* cited by examiner

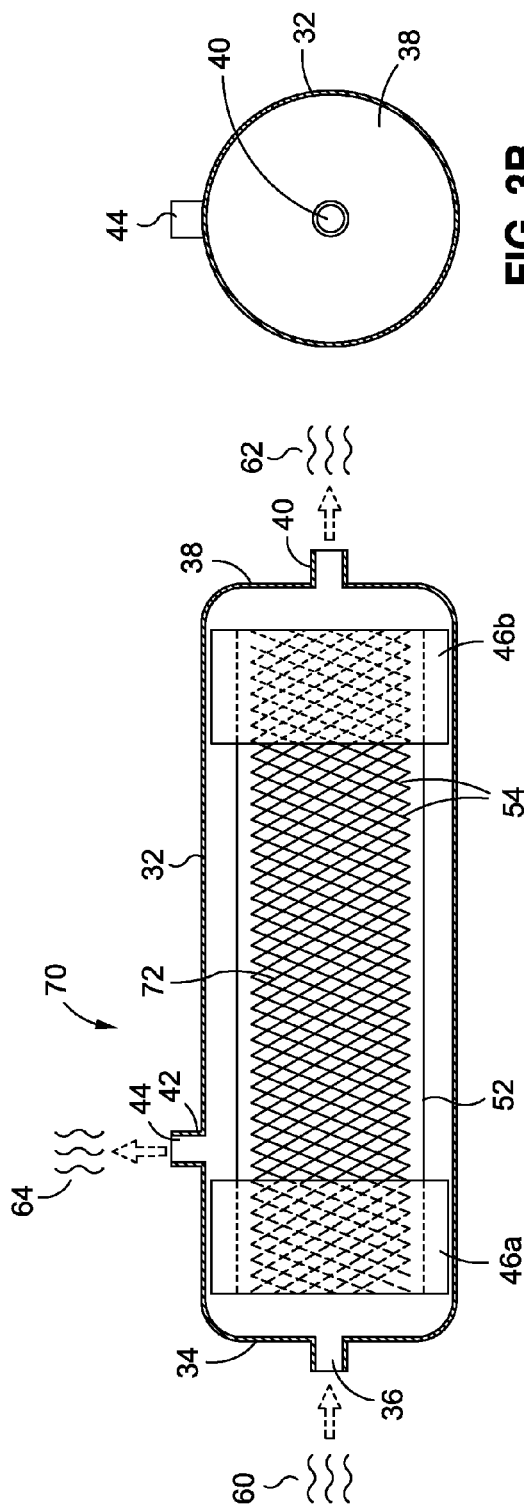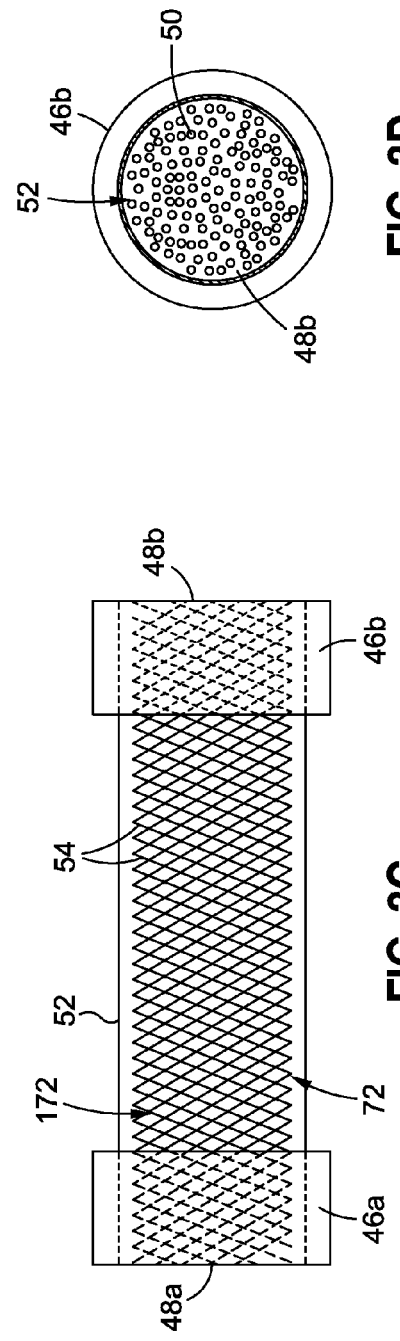
FIG. 3A (PRIOR ART)
FIG. 3B (PRIOR ART)
FIG. 3C (PRIOR ART)
FIG. 3D (PRIOR ART)

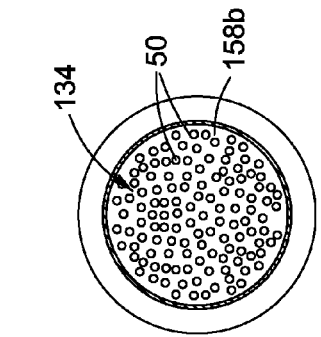
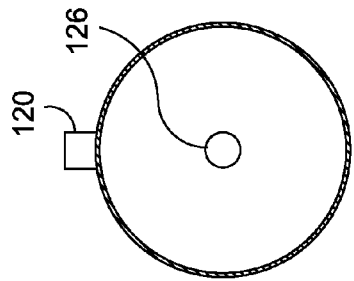
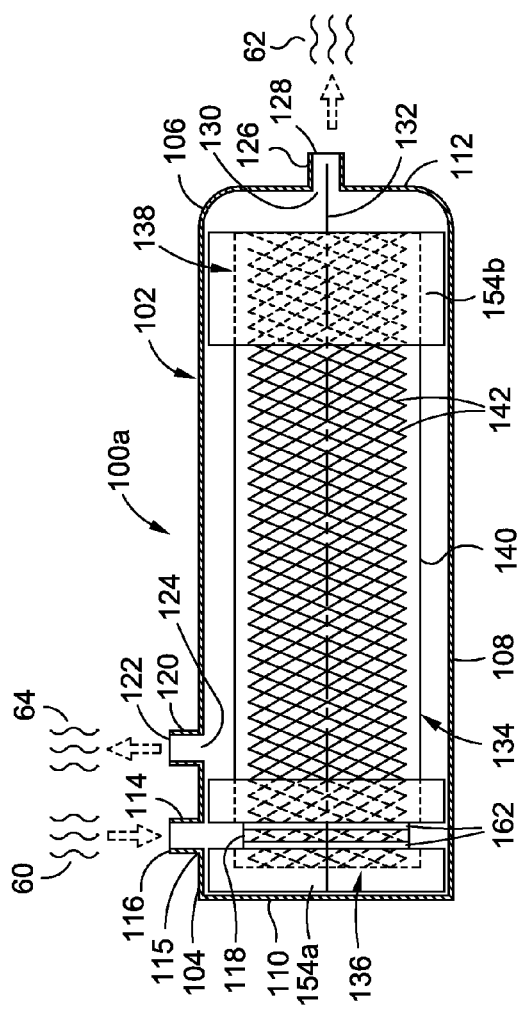
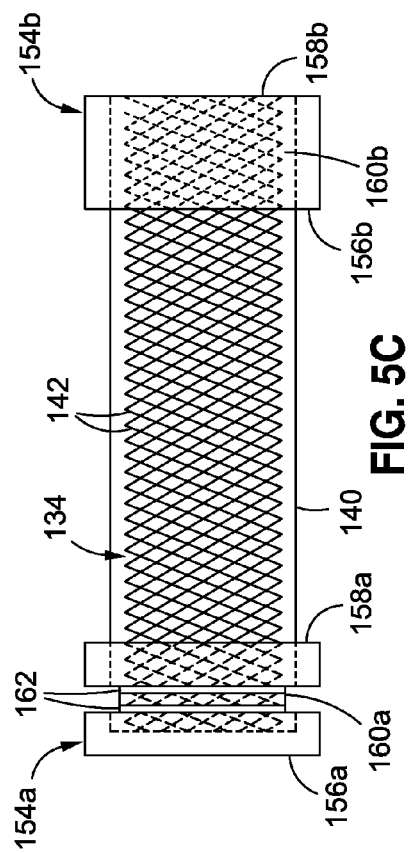

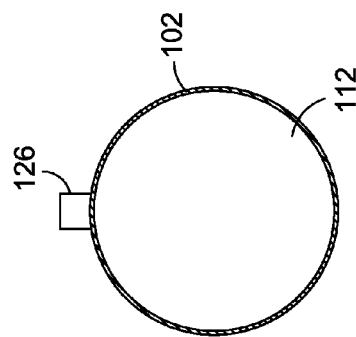
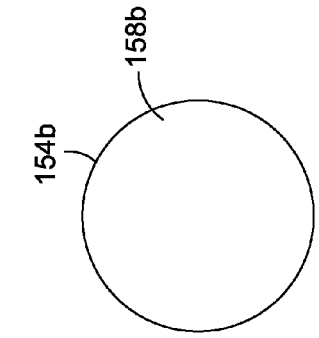
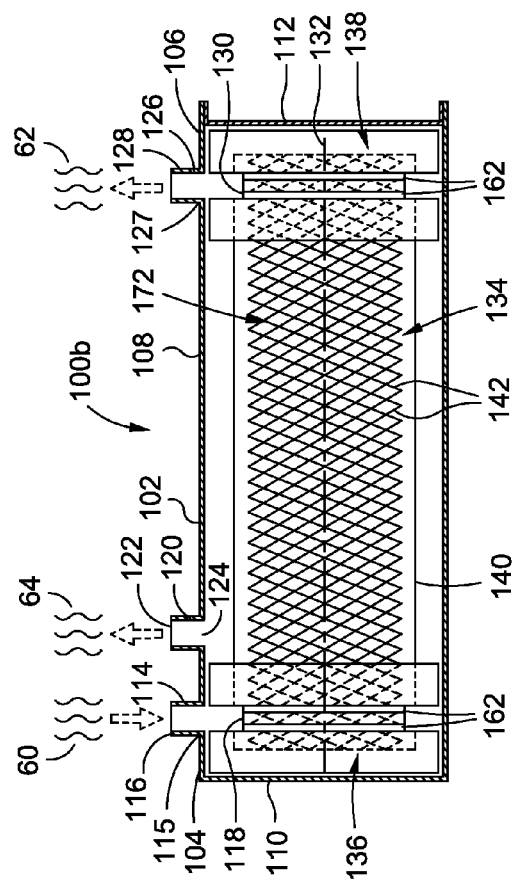
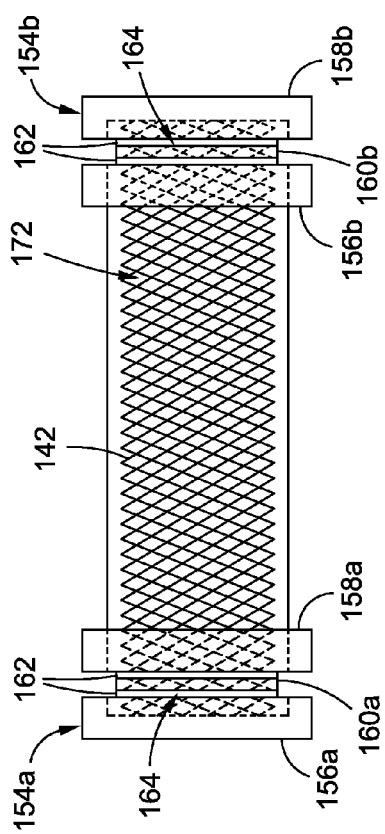

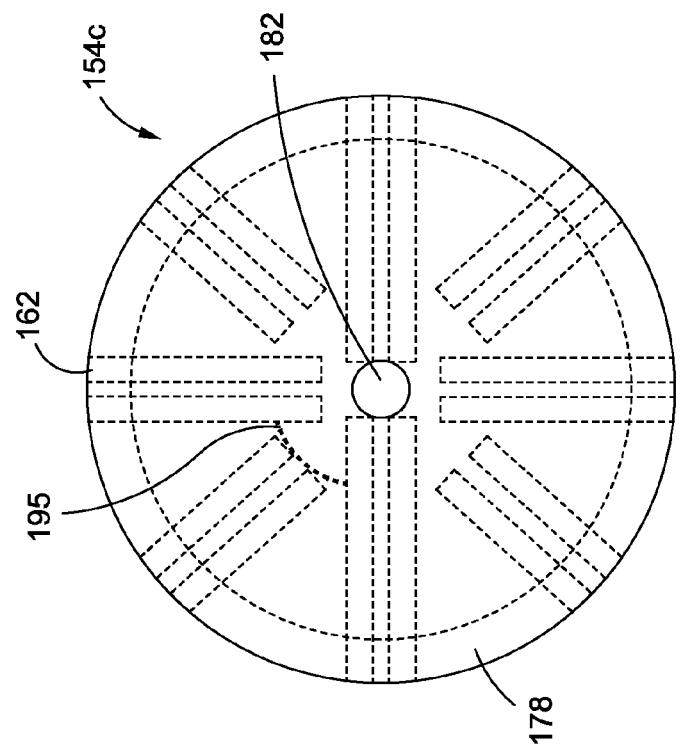
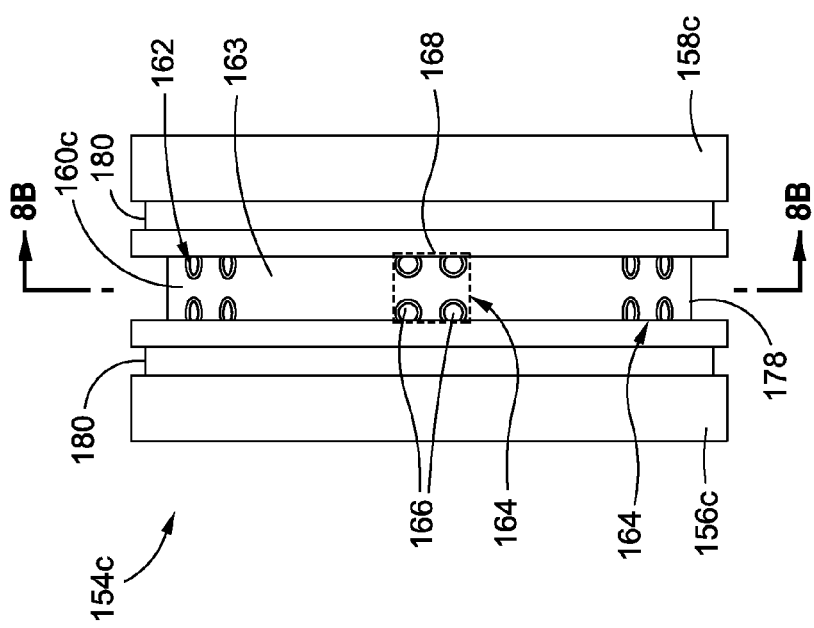
FIG. 8B
FIG. 8A

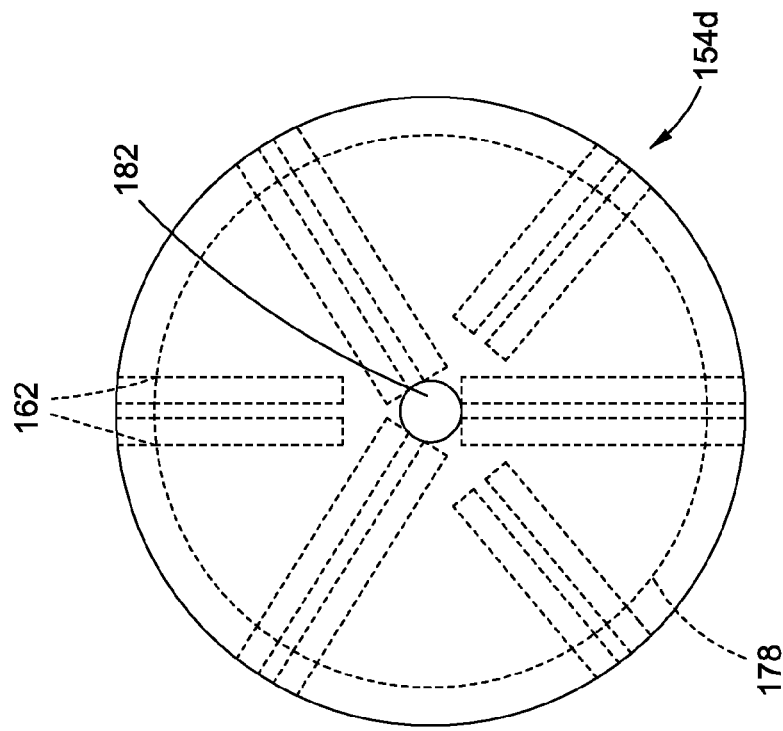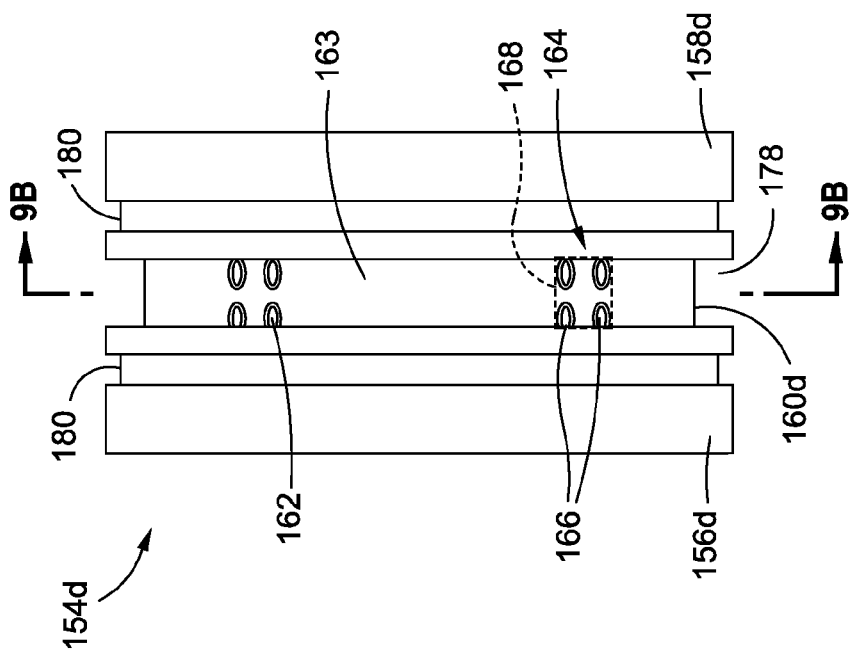

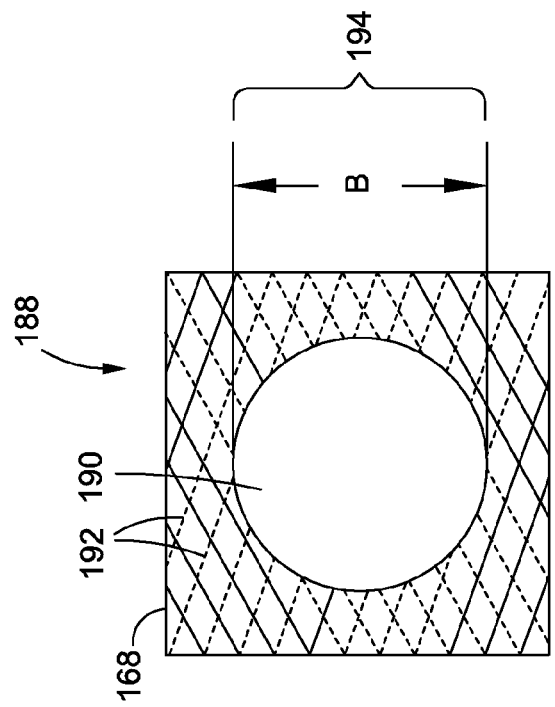
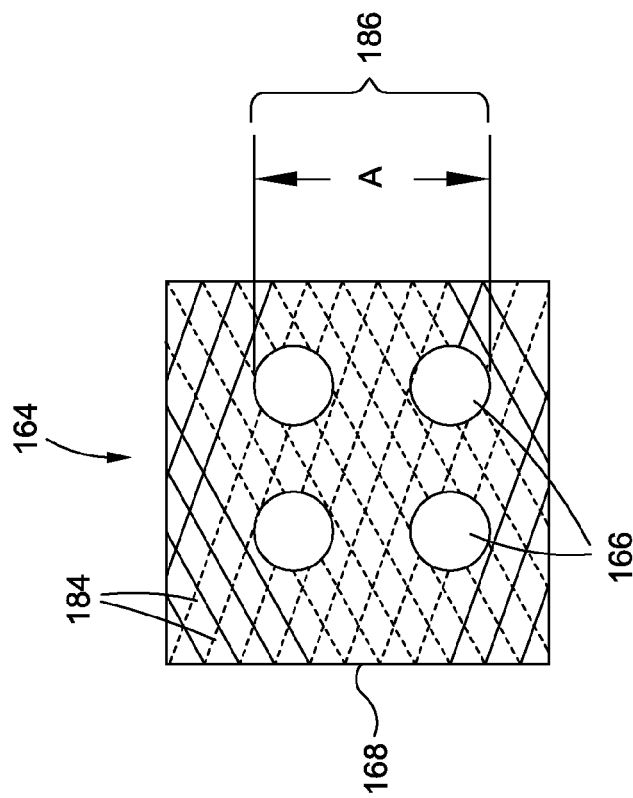
FIG. 12B
FIG. 12A

FLUID SEPARATION ASSEMBLY AND METHOD

CROSS-REFERENCE TO RELATED APPLICATION

This application claims priority to U.S. Provisional Patent Application Ser. No. 61/494,867, filed Jun. 8, 2011, which is incorporated herein by reference in its entirety.

FIELD

The disclosure relates generally to fluid separation assemblies or modules, and more particularly, to gas or air separation assemblies or modules for transport vehicles, such as aircraft.

BACKGROUND

Pursuant to Federal Aviation Regulation (FAR) Section 25.981(b) and European Aviation Safety Agency Certification Specification (EASA CS) Section 25.981(b)(2)(b)(3) amendment 6, new commercial aircraft are required to have a low flammability exposure. This has led to the development of inert gas generating systems (also known as OBIGGS (on-board inert gas generating systems), FRS (flammability reduction system), NGS (nitrogen generating system), FTIS (fuel tank inerting system)) on commercial aircraft. In addition, many military aircraft have incorporated fuel tank inerting systems into their designs. Such fuel tank inerting systems supply an inert gas, such as nitrogen enriched air (NEA), to purge fuel tanks and effectively reduce oxygen concentration levels therein. The component of such fuel tank inerting systems that enriches nitrogen is generally known as the gas separation assembly, or more particularly, as the air separation module (ASM). The gas separation assembly or ASM is used to generate NEA. Known gas separation assemblies or ASMs typically includes a fiber bundle 52 comprised of hollow fiber membranes 54 held by tubesheets 46 on each end and encapsulated by a shell or housing 32 (see FIG. 2A). Known gas separation assemblies or ASMs expose the hollow fiber membranes 54 by cutting off one side of the tubesheet 46 to expose the hollow fiber membranes 54 and openings 50 on the face 48 of the tubesheet 46.

Known tubesheets may be flat, may not be easily reinforced, and may typically be the life-limiting component of the gas separation assembly or ASM. In known gas separation assembly or ASM designs, feed gas, such as pressurized air, flows into or enters the gas separation assembly or ASM on one side of the tubesheet. Such design uses the tubesheet as a pressure boundary and can put stress or pressure on the tubesheet, which can reduce the service life of the tubesheet, and in turn, reduce the service life of the gas separation assembly or ASM. Moreover, the exposed hollow fiber membranes may be embedded in an epoxy matrix, and pressurizing the face or flat end of the tubesheet having the exposed hollow fiber membranes that have been embedded in the epoxy matrix may cause the epoxy matrix to crack and/or creep or separate from the fiber bundle, thus causing an aperture or opening for depressurization, which can lead to failure of the gas separation assembly or ASM. Further, due to material properties and design of known tubesheets, the gas separation assembly or ASM may not meet its expected service life at a desired system temperature.

To increase the service life of the gas separation assembly or ASM, known inerting systems have lowered the operating temperature of the system. The tubesheet material may have greater strength at lower temperatures but the lower temperature can reduce the inerting system's performance and may drive the need for additional gas separation assembly or ASM weight or pressure-boosting components. This is because higher temperatures may increase the efficiency of the separation of nitrogen and oxygen. Moreover, some known systems, commonly known as shell-side feed systems, reverse the flow of the feed gas, such as air, which allows the gas separation assembly or ASM shell or housing to provide support to the tubesheet. However, this can also reduce the performance of the gas separation assembly or ASM.

Accordingly, there is a need in the art for a gas separation assembly or ASM and method that provide advantages over known assemblies, systems, and methods.

SUMMARY

This need for a gas separation assembly or ASM and method is satisfied. As discussed in the below detailed description, embodiments of the assembly and method may provide significant advantages over existing assemblies, systems, and methods.

In an embodiment of the disclosure, there is provided a fluid separation assembly. The assembly comprises a hollow fiber bundle comprising a plurality of hollow fiber membranes. The assembly further comprises a first tubesheet and a second tubesheet encapsulating respective ends of the hollow fiber bundle, wherein one of the tubesheets has a plurality of radial through openings formed in the tubesheet. The assembly further comprises a housing surrounding the hollow fiber bundle and the first and second tubesheets, the housing having a feed inlet port, a permeate outlet port, and a non-permeate outlet port. The feed gas, permeate gas, or non-permeate gas are introduced into or removed from the hollow fiber membranes via the plurality of radial through openings formed in the tubesheet, such that the radial through openings of the tubesheet intersect each or substantially each of the hollow fiber membranes.

In another embodiment of the disclosure, there is provided a fluid separation assembly. The assembly comprises a hollow fiber bundle comprising a plurality of hollow fiber membranes. The assembly further comprises a first tubesheet and a second tubesheet encapsulating respective ends of the hollow fiber bundle, wherein at least one tubesheet has a plurality of radial through openings formed in the at least one tubesheet. The radial through openings are in a repeating four opening pattern comprising four openings in a substantially square configuration. The assembly further comprises a housing surrounding the hollow fiber bundle and the first and second tubesheets, the housing having a feed inlet port, a permeate outlet port, and a non-permeate outlet port. Feed gas, permeate gas, or non-permeate gas are introduced into or removed from the hollow fiber membranes via the plurality of radial through openings formed in the at least one tubesheet, such that the radial through openings of the at least one tubesheet intersect each or substantially each of the hollow fiber membranes.

In another embodiment of the disclosure, there is provided an aircraft comprising an airframe, at least one fuel tank mounted on the airframe, at least one fuel tank vent operatively connected to the fuel tank, and an inert gas generating system for generating inert gas on-board the aircraft. The inert gas generating system includes a gas separation assembly. The gas separation assembly comprises a hollow fiber bundle comprising a plurality of hollow fiber membranes. The gas separation assembly further comprises a first tubesheet and a second tubesheet encapsulating respective ends of the hollow fiber bundle, wherein one of the tubesheets has a plurality of radial through openings formed in the tubesheet. The gas separation assembly further comprises a housing surrounding the hollow fiber bundle and the first and second tubesheets, the housing having a feed inlet port, a permeate outlet port, and a non-permeate outlet port. Feed gas, permeate gas, or non-permeate gas are introduced into or removed from the hollow fiber membranes via the plurality of radial through openings formed in the tubesheet, such that the radial through openings of the tubesheet intersect each or substantially each of the hollow fiber membranes.

In another embodiment of the disclosure, there is provided a method for supplying nitrogen enriched air from a fluid separation assembly to at least one fuel tank of a transport vehicle. The method comprises providing a fluid separation assembly. The fluid separation assembly comprises a hollow fiber bundle comprising a plurality of hollow fiber membranes. The fluid separation assembly further comprises a first tubesheet and a second tubesheet encapsulating respective ends of the hollow fiber bundle, wherein the first tubesheet has a plurality of radial through openings formed in the tubesheet that intersect each or substantially each of the hollow fiber membranes. The fluid separation assembly further comprises a housing surrounding the hollow fiber bundle and the first and second tubesheets, the housing having a feed inlet port, a permeate outlet port, and a non-permeate outlet port. The method further comprises introducing air through the feed inlet port and through the radial through openings to induce air flow through the hollow fiber membranes. The method further comprises removing non-nitrogen permeate gases from the hollow fiber membranes along the fiber bundle and out through the permeate outlet port. The method further comprises removing the nitrogen enriched air out through the non-permeate outlet port. The method further comprises supplying the nitrogen enriched air to at least one fuel tank of a transport vehicle.

In another embodiment of the disclosure, there is provided a method for minimizing pressure loads and bending moments in a fluid separation assembly. The method comprises providing a fluid separation assembly. The fluid separation assembly comprises a hollow fiber bundle comprising a plurality of hollow fiber membranes. The fluid separation assembly further comprises a first tubesheet and a second tubesheet encapsulating respective ends of the hollow fiber bundle. The fluid separation assembly further comprises a housing surrounding the hollow fiber bundle and the first and second tubesheets, the housing having a feed inlet port, a permeate outlet port, and a non-permeate outlet port. The method further comprises forming a plurality of radial through openings in one of the tubesheets, such that the radial through openings intersect each or substantially each of the hollow fiber membranes. The method further comprises introducing or removing feed gas, permeate gas, or non-permeate gas into and out of the hollow fiber membranes via the radial through openings, thereby minimizing pressure loads and bending moments on the tubesheet.

In another embodiment of the disclosure, there is provided a method of generating nitrogen enriched air. The method comprises introducing air radially through radial through openings formed in a first tubesheet encapsulated end of a hollow fiber bundle of hollow fiber membranes, wherein the radial through openings intersect each or substantially each of the hollow fiber membranes. The method further comprises permeating a permeate gas comprising oxygen, carbon dioxide, water, or a combination thereof, through walls of the hollow fiber membranes. The method further comprises flowing out nitrogen enriched air from an opening of a second tubesheet encapsulated end of the hollow fiber bundle of hollow fiber membranes.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 3A is an illustration of a side view in cross-section of another known gas separation assembly;

FIG. 3B is an illustration of a right end view of the gas separation assembly of FIG. 3A;

FIG. 3C is an illustration of a side view of the fiber bundle with tubesheets of the known gas separation assembly of FIG. 3A;

FIG. 3D is an illustration of a right end view of the fiber bundle with tubesheet of FIG. 3C;

FIG. 5A is an illustration of a side view in cross-section of one of the embodiments of a fluid separation assembly of the disclosure;

FIG. 5B is an illustration of a right end view of the fluid separation assembly of FIG. 5A;

FIG. 5C is an illustration of a side view of the fiber bundle with tubesheets of the fluid separation assembly of FIG. 5A;

FIG. 5D is an illustration of a right end view of a tubesheet of FIG. 5C;

FIG. 5E is an illustration of a side view in cross-section of another one of the embodiments of a fluid separation assembly of the disclosure;

FIG. 5F is an illustration of a right end view of the fluid separation assembly of FIG. 5E;

FIG. 5G is an illustration of a side view of the fiber bundle with tubesheets of the gas separation assembly of FIG. 5E;

FIG. 5H is an illustration of a right end view of a tubesheet of FIG. 5G;

FIG. 8A is an illustration of a side view of one of the embodiments of a tubesheet that may be used in one of the embodiments of the fluid separation assembly of the disclosure;

FIG. 8B is an illustration of a cross-sectional view taken along lines 8B-8B of FIG. 8A;

FIG. 9A is an illustration of a side view of another one of the embodiments of a tubesheet that may be used in one of the embodiments of the fluid separation assembly of the disclosure;

FIG. 9B is an illustration of a cross-sectional view taken along lines 9B-9B of FIG. 9A;

FIG. 12A is an illustration of a four opening pattern of radial through openings;

FIG. 12B is an illustration of a one opening pattern of radial through openings;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art. In the following description, various components are described for exemplary embodiments and are not meant to be limiting.

Figure 1:
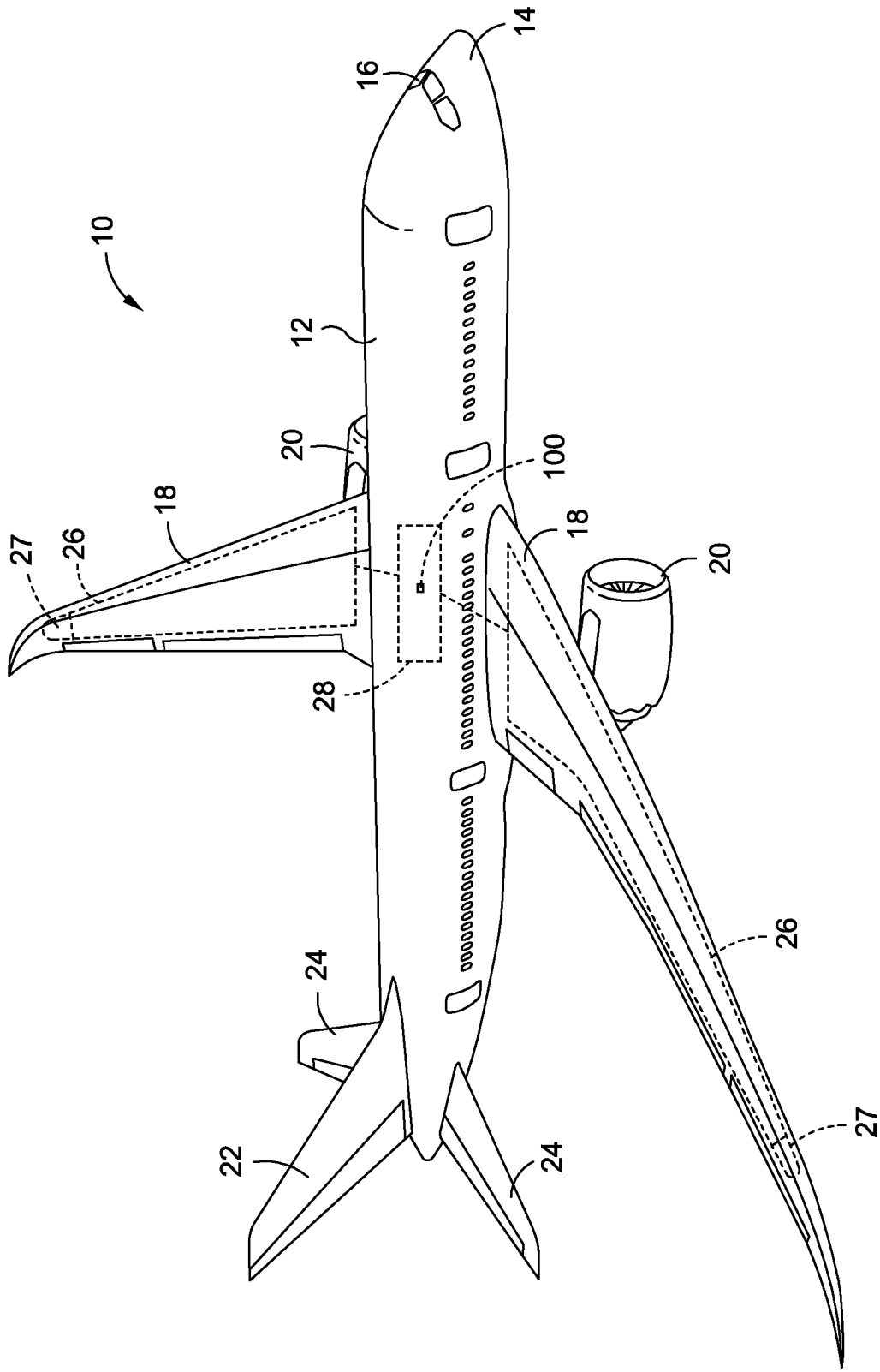
FIG. 1 is an illustration of a perspective view of an aircraft which may use one of the embodiments of a gas separation assembly and method of the disclosure.

Now referring to the Figures, FIG. 1 is an illustration of a perspective view of an aircraft 10 which may include and use one of the embodiments of a fluid separation assembly 100a (see FIG. 5A), 100b (see FIG. 5E), 100c (see FIG. 5I) and methods 200 (see FIG. 13), 300 (see FIG. 14), 400 (see FIG. 15) of the disclosure. The aircraft 10 comprises an airframe or fuselage 12, a nose 14, a cockpit 16, wings 18 operatively coupled to the airframe or fuselage 12, one or more propulsion units 20, a tail vertical stabilizer 22, and one or more tail horizontal stabilizers 24, fuel tanks 26, fuel tank vents 27, and an inert gas generating system 28. The inert gas generating system 28 may include embodiments of the fluid separation assembly disclosed herein. Although the aircraft 10 shown in FIG. 1 is generally representative of a commercial passenger aircraft, embodiments of the fluid separation assembly disclosed herein may also be employed in other types of manned or unmanned aircraft. More specifically, the teachings of the disclosed embodiments may be applied to other passenger aircraft, cargo aircraft, military aircraft, rotorcraft, and other types of aircraft or aerial vehicles. It may also be appreciated that embodiments of systems, methods and apparatuses in accordance with the disclosure may be utilized in other vehicles, such as tanker ships, fuel supply ships, boats and other watercraft, trains, automobiles, trucks, buses, and other types of vehicles. It may also be appreciated that embodiments of systems, methods and apparatuses in accordance with the disclosure may be utilized in non-vehicle applications, such as portable ground support applications that require separation of fluids, for example, devices for filling tires, devices for welding joints, or other suitable portable ground support applications. Other non-vehicle applications may include medical applications, for example, medical oxygen use and generation; food storage applications, such as devices for food storage and preservation; purification of natural gas; Volatile Organic Compound (VOC) removal; dehumidification; and other suitable non-vehicle applications.

Figures 2A, 2B:
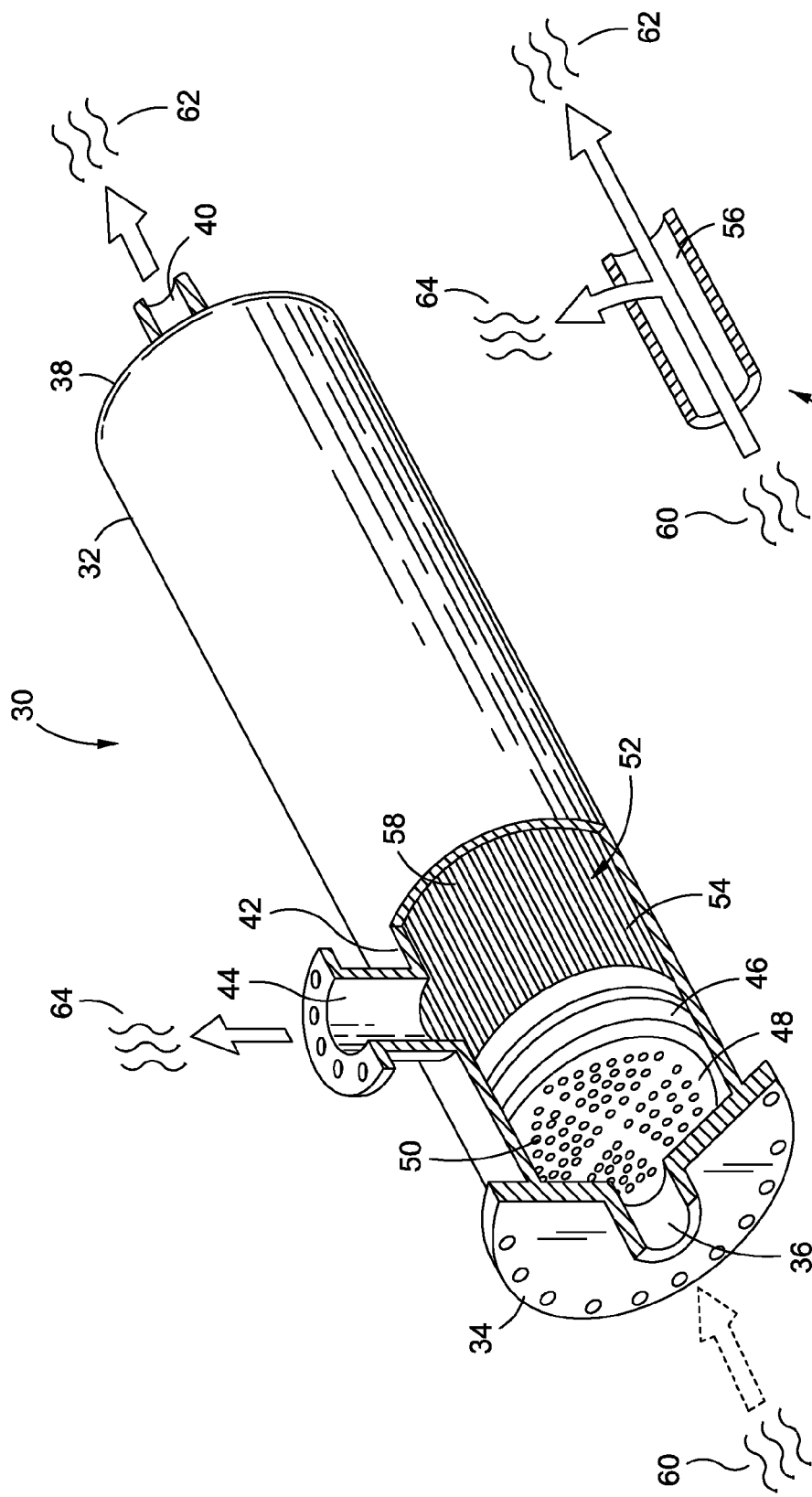
FIG. 2A is an illustration of a partial cut-away perspective view of a known gas separation assembly.
FIG. 2B is an illustration of a partial cut-away perspective view of the direction of gas flow through a hollow fiber membrane of the known gas separation assembly of FIG. 2A.

FIG. 2A is an illustration of a partial cut-away perspective view of a known gas separation assembly 30, such as an air separation module (ASM). As shown in FIG. 2A, the gas separation assembly 30 has a housing 32 with a first end 34 having a feed inlet port 36, a second end 38 having a non-permeate outlet port 40, and a side portion 42 having a permeate outlet port 44. The gas separation assembly 30 further has one or more tubesheets 46 each having a face 48 with a plurality of through openings 50. The gas separation assembly 30 further has a fiber bundle 52 comprising a plurality of hollow fiber membranes 54 arranged in a parallel configuration 58 that are held or potted in the tubesheet 46, where each hollow fiber membrane 54 has a fiber membrane wall 56 (see FIG. 2B). High pressure feed gas 60, such as air, enters the feed inlet port 36 and distributes across the face 48 of the tubesheet 46 into the hollow fiber membranes 54. As the feed gas 60, such as air, progresses along the length of the hollow fiber membranes 54, non-permeate gas 62 or inert gas, such as nitrogen enriched air (NEA), exits the hollow fiber membranes 54 through the non-permeate outlet port 40, and permeate gas 64, such as oxygen enriched waste air which may comprise oxygen ($O_2$), carbon dioxide ($CO_2$), and/or water ($H_2O$), permeates through the fiber membrane walls 56 and exits out the permeate outlet port 44. FIG. 2B is an illustration of a partial cut-away perspective view of the direction of gas flow, such as feed gas 60, non-permeate gas 62, and permeate gas 64, through the hollow fiber membranes 54 of the known gas separation assembly 30 of FIG. 2A.

FIG. 3A is an illustration of a side view in partial cross-section of another known gas separation assembly 70, such as an air separation module (ASM) in which the hollow fiber membranes 54 are arranged in a criss-cross or helical configuration 72. As shown in FIG. 3A, like the gas separation module 30 of FIG. 2A, the gas separation assembly 70 has housing 32 with the first end 34 having the feed inlet port 36, the second end 38 having the non-permeate outlet port 40, and the side portion 42 having the permeate outlet port 44. The gas separation module 70 further has two tubesheets 46a, 46b. As shown in FIG. 3D, the tubesheet 46b has a face 48b with a plurality of through openings 50. The gas separation assembly 70 further has the fiber bundle 52 comprising the plurality of hollow fiber membranes 54 arranged in a criss-cross configuration 72 that are held or potted on each end by the two tubesheets 46a, 46b. High pressure feed gas 60, such as air, enters the feed inlet port 36 and distributes across the face 48a of the tubesheet 46a into the hollow fiber membranes 54. As the feed gas 60, such as air, progresses along the length of each hollow fiber membrane 54, non-permeate gas 62 or inert gas, such as nitrogen enriched air (NEA), exits the hollow fiber membranes 54 through the non-permeate outlet port 40, and permeate gas 64, such as oxygen enriched waste air stream which may comprise oxygen ($O_2$), carbon dioxide ($CO_2$), and/or water ($H_2O$), permeates through the fiber membrane walls 54 (see FIG. 2B) and exits out the permeate outlet port 44. FIG. 3B is an illustration of a right end view of the second end 38 of the gas separation assembly 70 of FIG. 3A. FIG. 3B shows the second end 38 of the housing 32, the non-permeate outlet port 40, and the permeate outlet port 44. FIG. 3C is an illustration of a side view of the fiber bundle 52 and the tubesheets 46a, 46b of the known gas separation assembly 70 of FIG. 3A. FIG. 3D is an illustration of a right end view of the fiber bundle 52 and face 48b of tubesheet 46b of FIG. 3C. FIG. 3D shows the face 48b of the tubesheet 46b, the fiber bundle 52, and the through openings 50 on the face 48b of the tubesheet 46b.

Figure 4A:
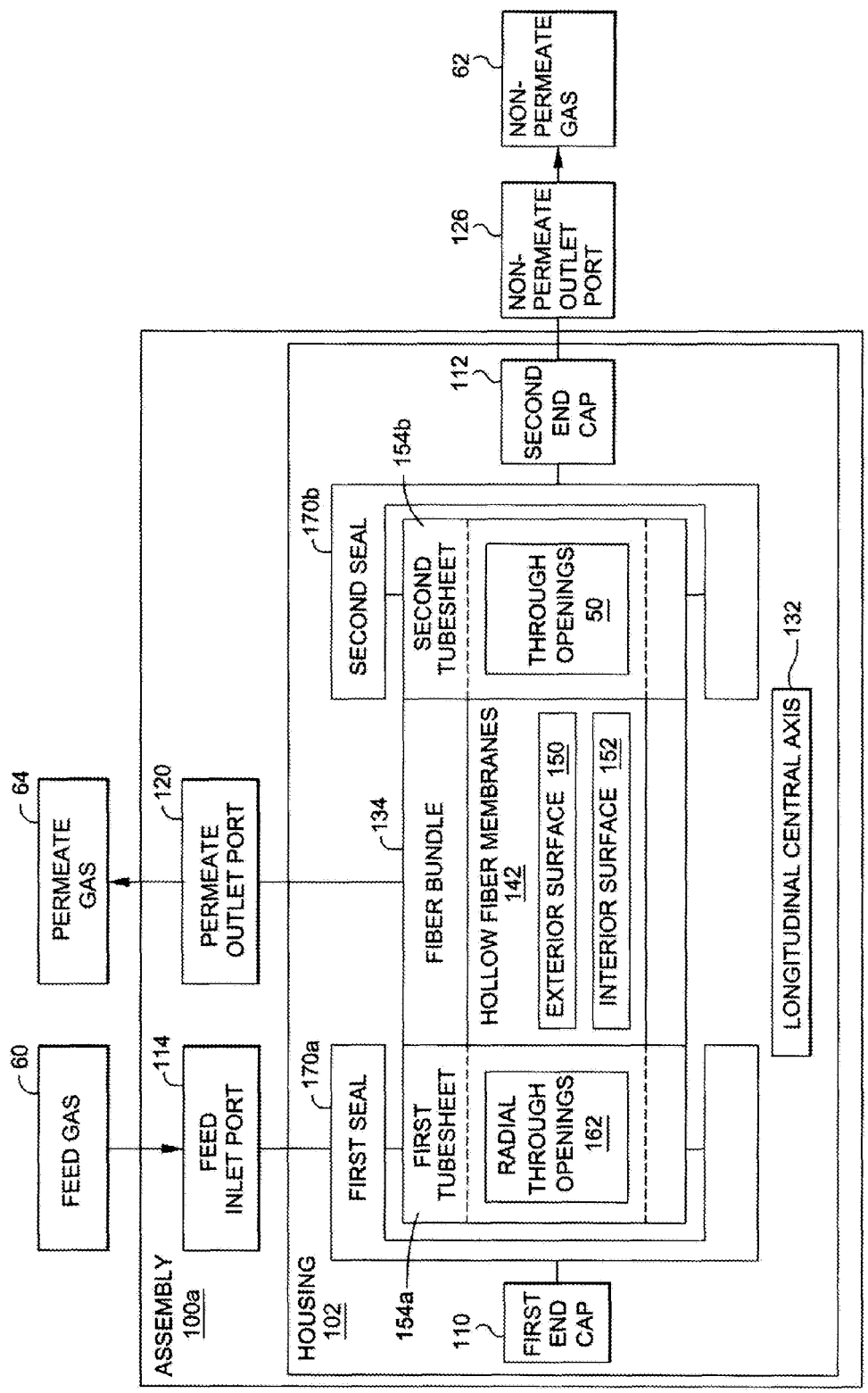
FIG. 4A is an illustration of a block diagram of one of the embodiments of a fluid separation assembly of the disclosure.
Figure 4B:
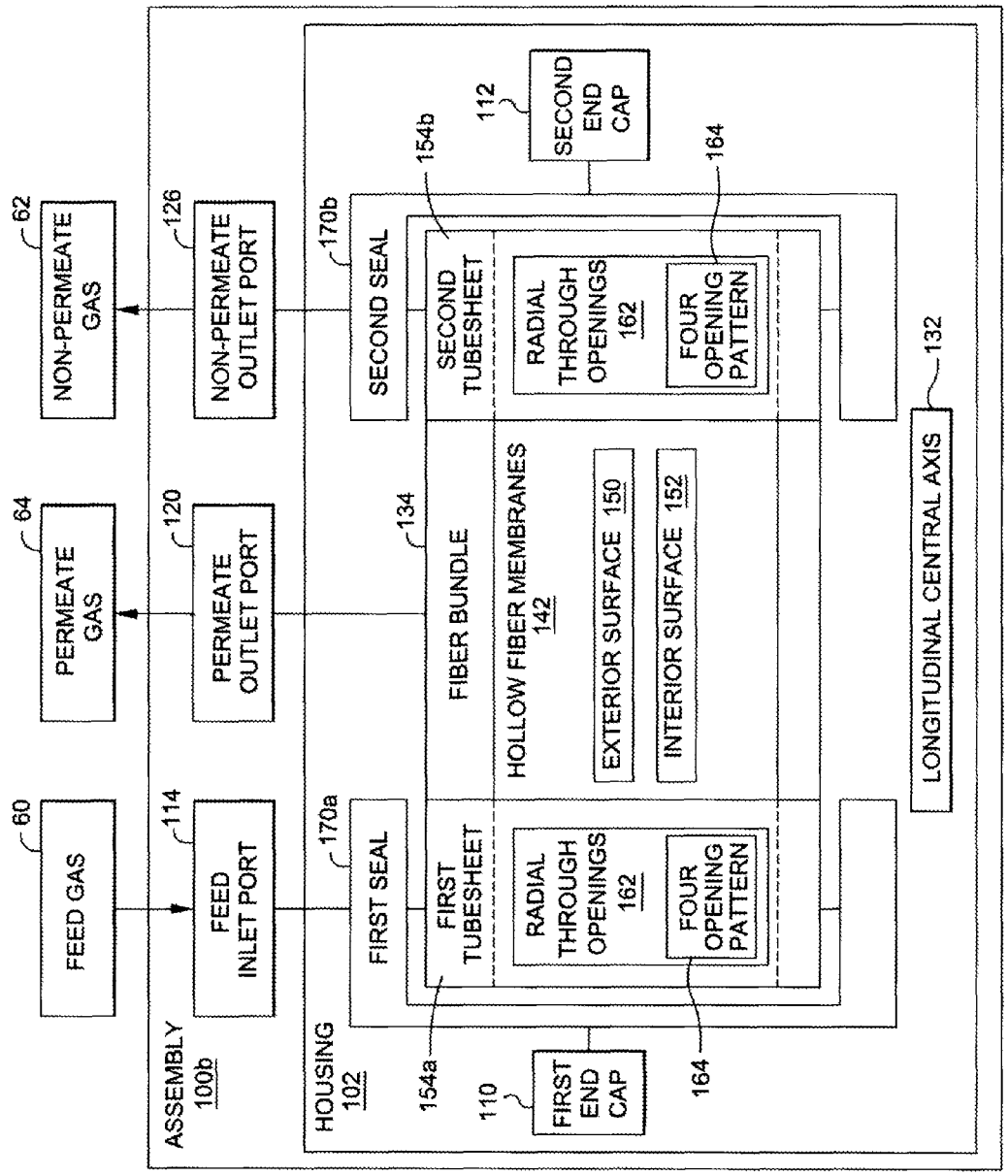
FIG. 4B is an illustration of a block diagram of another one of the embodiments of a fluid separation assembly of the disclosure.

Disclosed herewith are exemplary embodiments of novel designs of a fluid separation assembly 100a (see FIG. 5A), 100b (see FIG. 5E), 100c (see FIG. 5I), such as a gas separation module, for example, an air separation module (ASM). FIG. 4A is an illustration of a block diagram of one of the embodiments of a fluid separation assembly 100a of the disclosure. FIG. 4B is an illustration of a block diagram of another one of the embodiments of a fluid separation assembly 100b of the disclosure.

FIG. 5A is an illustration of a side view in cross-section of one of the embodiments of the fluid separation assembly 100a of the disclosure having hollow fiber membranes 142 in a criss-cross or helical configuration 172. FIG. 5B is an illustration of a right end view of the fluid separation assembly 100a of FIG. 5A. FIG. 5C is an illustration of a side view of a hollow fiber bundle 134 with tubesheets 154a, 154b of the fluid separation assembly 100a of FIG. 5A. FIG. 5D is an illustration of a right end view of tubesheet 154b of FIG. 5C.

FIG. 5E is an illustration of a side view in cross-section of one of the embodiments of the fluid separation assembly 100b of the disclosure having hollow fiber membranes 142 in a criss-cross or helical configuration 172. FIG. 5F is an illustration of a right end view of the fluid separation assembly 100b of FIG. 5E. FIG. 5G is an illustration of a side view of the hollow fiber bundle 134 with tubesheets 154a, 154b of the fluid separation assembly 100b of FIG. 5E. FIG. 5H is an illustration of a right end view of tubesheet 154b of FIG. 5G.

Figure 5J:
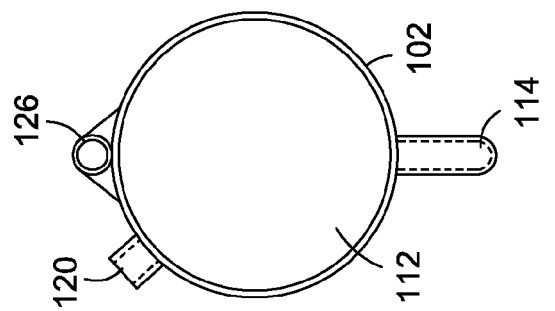
FIG. 5J is an illustration of a right end view of the fluid separation assembly of FIG. 5I.
Figure 5I:
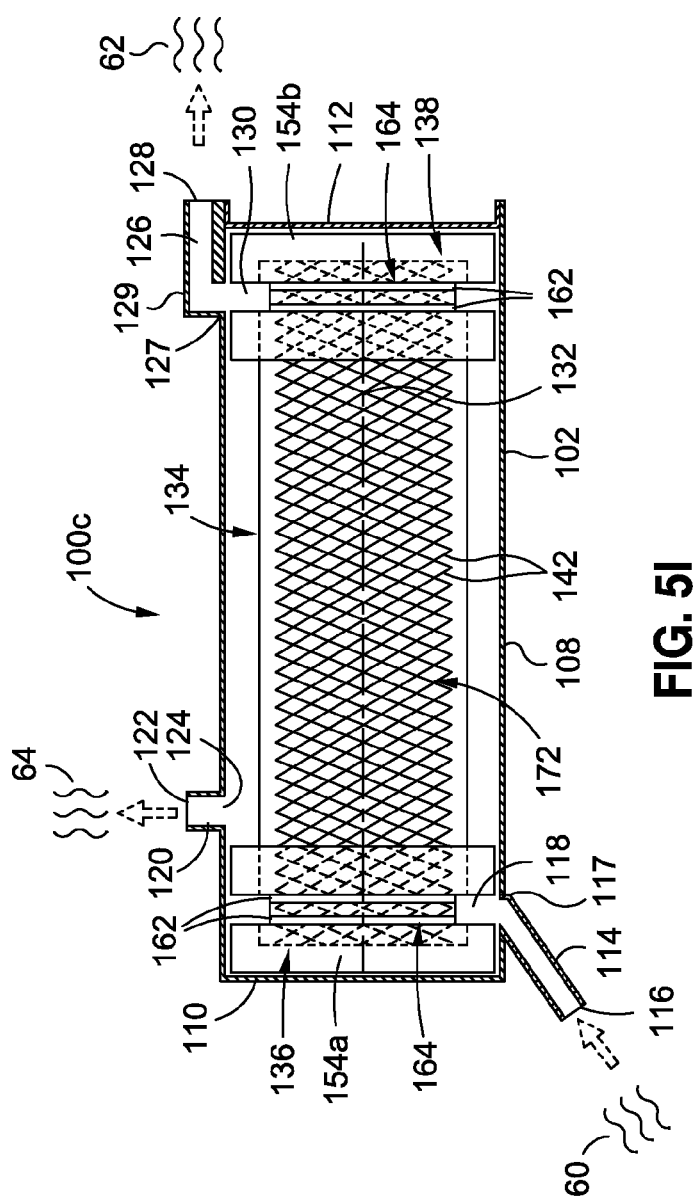
FIG. 5I is an illustration of a side view in cross-section of yet another one of the embodiments of a fluid separation assembly of the disclosure.

FIG. 5I is an illustration of a side view in cross-section of yet another one of the embodiments of a fluid separation assembly 100c of the disclosure. FIG. 5J is an illustration of a right end view of the fluid separation assembly 100c of FIG. 5I.

Figure 6A:
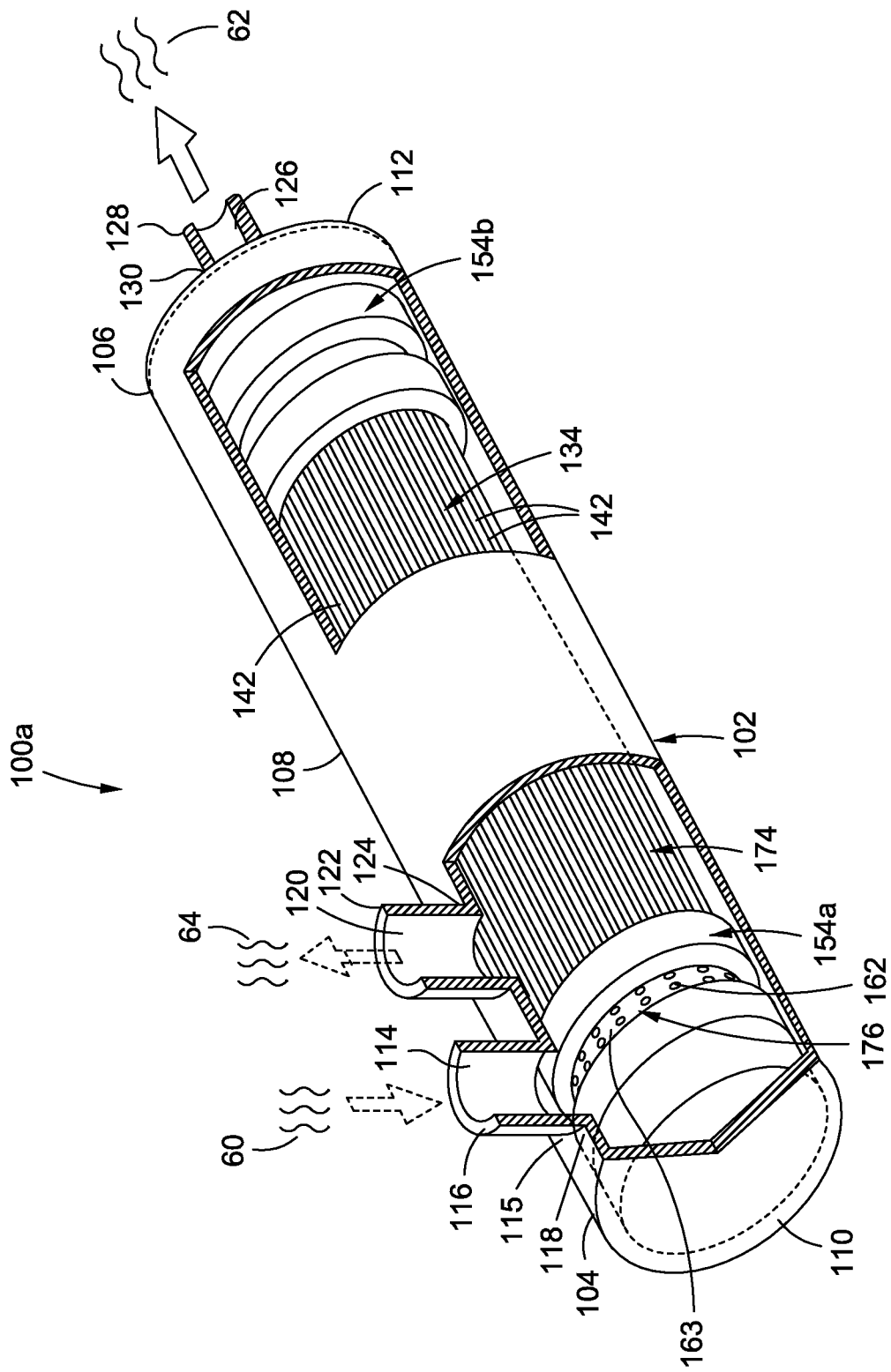
FIG. 6A is an illustration of a partial cut-away perspective view of one of the embodiments of a fluid separation assembly of the disclosure.
Figure 6B:
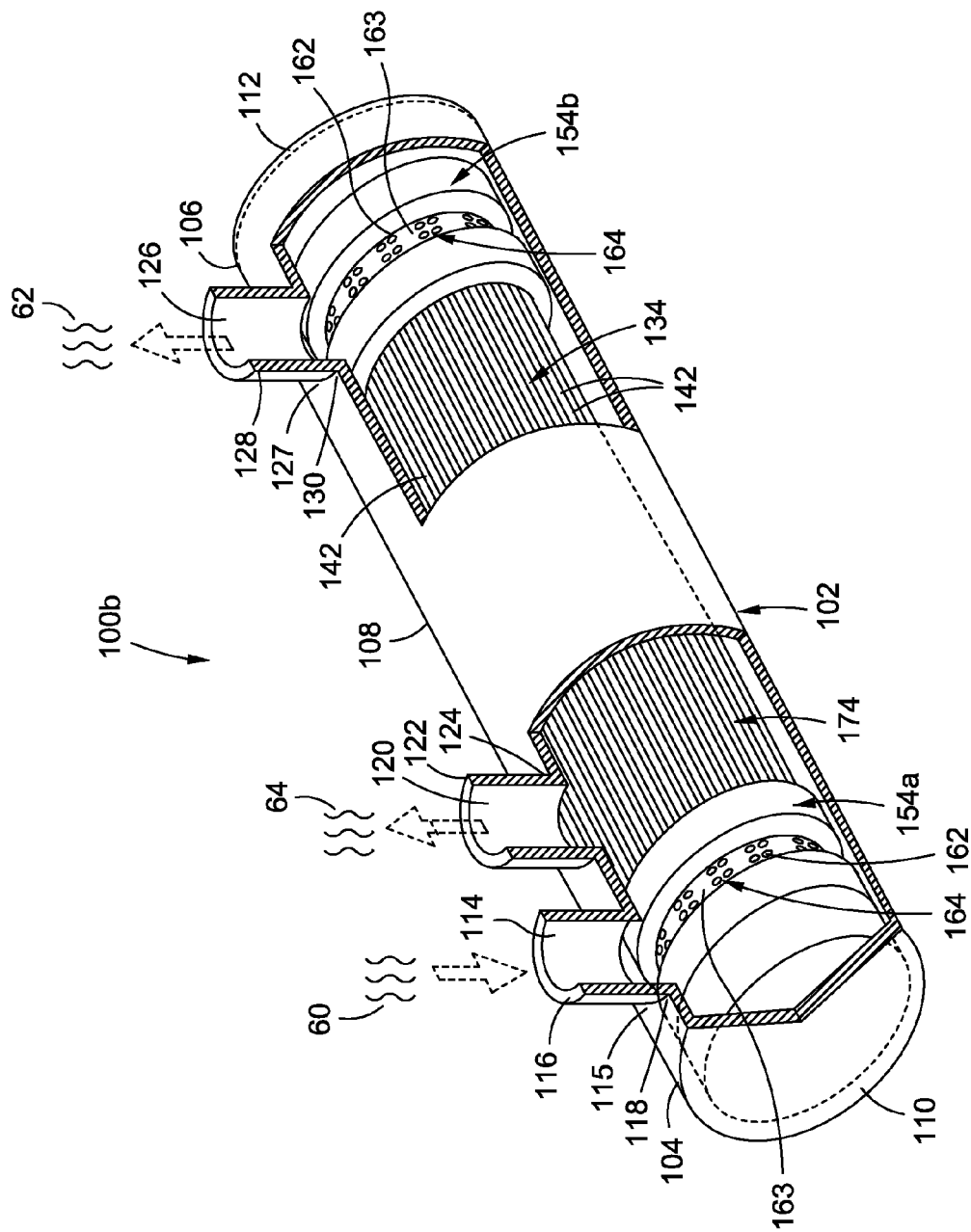
FIG. 6B is an illustration of a partial cut-away perspective view of another one of the embodiments of a fluid separation assembly of the disclosure.

FIG. 6A is an illustration of a partial cut-away perspective view of one of the embodiments of the fluid separation assembly 100a having hollow fiber membranes 142 in a parallel configuration 174. FIG. 6B is an illustration of a partial cut-away perspective view of one of the embodiments of the fluid separation assembly 100b having hollow fiber membranes 142 in a parallel configuration 174.

As shown in FIGS. 4A-6B, each fluid separation assembly 100a, 100b, 100c comprises a housing 102 that is preferably cylindrical in shape. However, the housing 102 may also comprise another suitable shape or design. As shown in FIGS. 5A, 6A, the housing 102 comprises a first end 104, a second end 106, and a body 108. A first end cap 110 may be removably or permanently attached to the first end 104 of the housing 102. A second end cap 112 may be removably or permanently attached to the second end 106 of the housing 102. Preferably, the first end cap 110 and the second end cap 112 are closed or sealed.

As shown in FIGS. 4A-6B, the housing 102 further comprises a feed inlet port 114 having a first feed inlet port end 116 and a second feed inlet port end 118. In one embodiment, as shown in FIGS. 5A, 5E, 6A, 6B, the feed inlet port 114 may be formed on or extends from an upper portion 115 of the body 108 or side of the housing 102 instead of the first end 34 (see FIG. 2A) as in existing designs. In another embodiment, as shown in FIG. 5I, the feed inlet port 114 may be formed on or extends from a lower portion 117 of the body 108 of the housing 102. As shown in FIGS. 4A-6B, the housing 102 further comprises a permeate outlet port 120 having a first permeate outlet port end 122 and a second permeate outlet port end 124. As shown in FIGS. 4A-6B, the housing 102 further comprises a non-permeate outlet port 126 having a first non-permeate outlet port end 128 and a second non-permeate outlet port end 130. In one embodiment of the fluid separation assembly 100a, as shown in FIGS. 4A, 5A, 6A, the non-permeate outlet port 126 is formed on or extends from the second end cap 112 at the second end 106 of the housing 102. In another embodiment of the fluid separation assembly 100b, as shown in FIGS. 4B, 5E, 6B, the non-permeate outlet port 126 may be formed on or extends from an upper portion 127 of the body 108 or side of the housing 102 instead of the second end cap 112. In yet another embodiment of the fluid separation assembly 100c, as shown in FIG. 5I, the non-permeate outlet port 126 may be formed on or extends from the upper portion 127 of the body 108 or side of the housing 102 instead of the second end cap 112, and the non-permeate outlet port 126 may have a bent portion 129. The feed inlet port 114, the permeate outlet port 120, and/or the non-permeate outlet port 126 may be oriented tangentially to a longitudinal central axis 132 (see FIG. 5E) of the housing 102, may be oriented perpendicular to or inclined to the longitudinal central axis 132 (see FIG. 6B) of the housing 102, may be oriented non-tangentially to the longitudinal central axis 132 (see FIG. 5I) of the housing 102, or may be oriented in another suitable position. For the embodiment of the fluid separation assembly 100b shown in FIGS. 5E, 6B, preferably, the feed inlet port 114, the permeate outlet port 120, and the non-permeate outlet port 126 are tangential to and not parallel to the longitudinal central axis 132 of the housing 102.

Figure 7A:
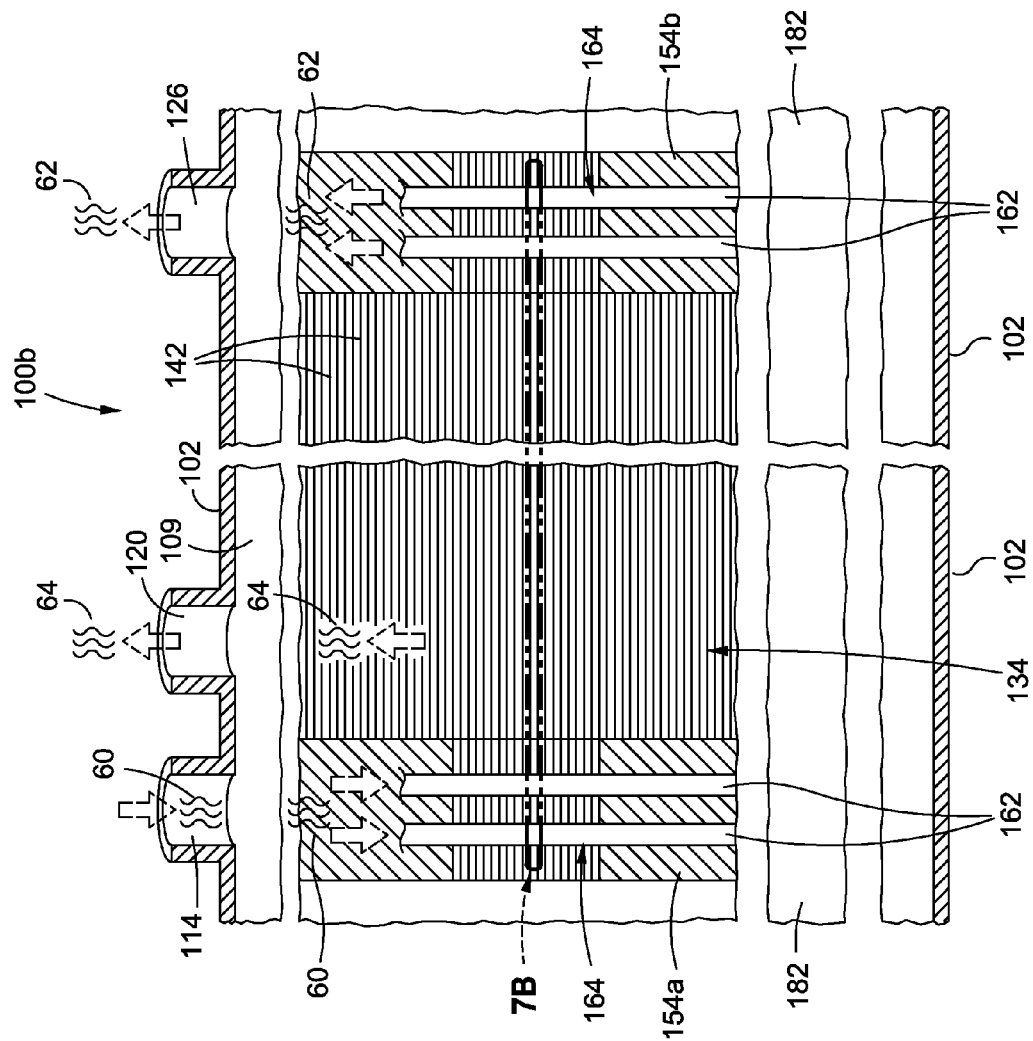
FIG. 7A is an illustration of a side view in partial cross-section showing fluid flow through the radial through openings of one of the embodiments of a fluid separation assembly of the disclosure.
Figure 7B:
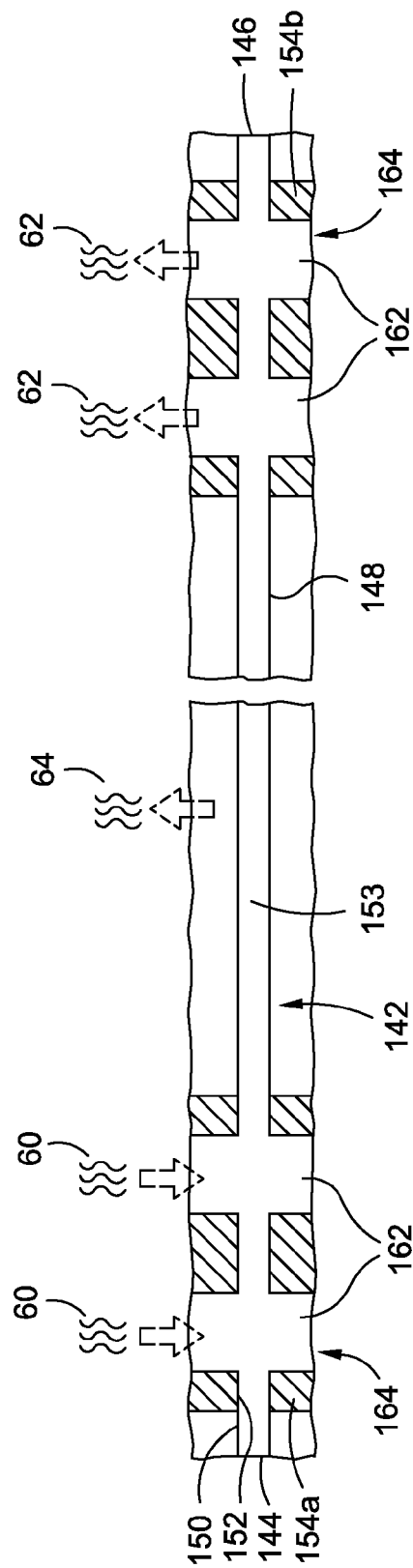
FIG. 7B is an illustration of an enlarged side view in partial cross-section showing fluid flow through an individual hollow fiber membrane of the fluid separation assembly of FIG. 7A.

As shown in FIGS. 4A-6B, each assembly 100a, 100b, 100c further comprises a hollow fiber bundle 134 positioned or disposed within the housing 102. As shown in FIG. 5A, the hollow fiber bundle 134 comprises end 136 formed and encapsulated by a first tubesheet 154a, discussed below, and comprises end 138 formed and encapsulated by a second tubesheet 154b, discussed below. The hollow fiber bundle 134 further comprises a body portion 140. The hollow fiber bundle 134 comprises a plurality of hollow fiber membranes 142. As shown in FIG. 7B, each hollow fiber membrane 142 has a first end 144, a second end 146 and an elongated body portion 148, as well as an exterior surface 150 and an interior surface 152. The hollow fiber membranes 142 are preferably permeable or active along the body portion 140 of the hollow fiber bundle. The first ends 144 of the hollow fiber membranes 142 encapsulated by the first tubesheet 154a are not permeable, and the second ends 146 of the hollow fiber membranes 142 encapsulated by the second tubesheet 154b are not permeable. Preferably, the hollow fiber membranes 142 are made of a flexible polymeric material such as thermoplastic, PEEK (polyether ether ketone), polysulfones, polyimides, or another suitable flexible polymeric material. The hollow fiber membranes 142 may be arranged in various configurations. For example, the hollow fiber membranes 142 may be arranged in a criss-cross or helical configuration 172 (see FIGS. 5A, 5E, 5I), or the hollow fiber membranes 142 may be arranged in a parallel configuration 174 (see FIGS. 6A, 6B), or the hollow fiber membranes 142 may be arranged in another suitable configuration.

As shown in FIGS. 4A-6B, each assembly 100a, 100b, 100c further comprises a first tubesheet 154a and a second tubesheet 154b encapsulating respective ends 136, 138 of the hollow fiber bundle. Preferably, both of the first and second tubesheets 154a, 154b are both positioned or disposed within the housing 102. As shown in FIG. 5C, the first tubesheet 154a has a first end 156a, a second end 158a, and a body portion 160a. The first tubesheet 154a preferably encapsulates the first ends 144 of the hollow fiber membranes 142 and forms end 136 of the hollow fiber bundle 134. The first ends 144 of the hollow fiber membranes 142 which are exposed are preferably embedded in an epoxy matrix or another suitable polymer matrix to form the first tubesheet 154a. As shown in FIG. 5C, the second tubesheet 154b has a first end 156b, a second end 158b, and a body portion 160b. The second tubesheet 154b preferably encapsulates the second ends 146 of the hollow fiber membranes 142 and forms end 138 of the hollow fiber bundle 134. The second ends 146 of the hollow fiber membranes 142 which are exposed are preferably embedded in an epoxy matrix or another suitable polymer matrix to form the second tubesheet 154b. The housing 102 preferably surrounds the hollow fiber bundle 134 with the first and second tubesheets 154a, 154b. The first and second tubesheets 154a, 154b, as well as tubesheets 154c (see FIG. 8A), 154d (see FIG. 9A), 154e (see FIG. 10A), and 154f (see FIG. 11A), may preferably be comprised of a polymer material such as epoxy or another suitable material.

With embodiments of the fluid separation assembly 100a, 100b, 100c, if the fluid separation assembly is operated at higher air temperatures than known gas separation assemblies, e.g., air separation modules, the fluid separation assembly 100a, 100b, 100c may have a useful service life of about the same as the known gas separation assemblies but requires less load than the known gas separation assemblies. With embodiments of the fluid separation assembly 100a, 100b, 100c, if the fluid separation assembly is operated at about the same temperature as known gas separation assemblies, e.g., air separation modules, the fluid separation assembly 100a, 100b, 100c may have a longer useful service life than the known gas separation assemblies but about the same load as the known gas separation assemblies. Embodiments of the fluid separation assembly disclosed herein preferably are constructed or assembled in order to operate at their most optimum temperature and pressure for a desired application. For example, embodiments of the fluid separation assembly 100a, 100b, 100 for aircraft may operate in a temperature range of about 120 degrees Fahrenheit to about 210 degrees Fahrenheit, or higher. There are circumstances that drive different temperature selections for different applications, for example, some epoxy materials may operate at higher temperatures than others. In addition, size, weight, and upstream cooling requirements may be reduced as inlet temperature increases. For example, the preferred temperature range for an aircraft system, to minimize the fluid separation assembly or air separation module size and weight and upstream cooling requirements at the cost of increased air consumption, may be selected from the highest temperature the fluid separation assembly or air separation module can tolerate less the normal temperature control band and design margin. Further, embodiments of the fluid separation assembly 100a, 100b, 100 for aircraft may operate in a pressure range of about 20 psi (pounds per square inch) to about 80 psi. The fluid separation assembly or air separation module size and weight may be reduced as the inlet pressure increases.

As shown in FIG. 4A, 4B, the assembly 100a, 100b, respectively, may further comprise a first seal 170a adjacent the first tubesheet 154a and a second seal 170b adjacent the second tubesheet 154b, wherein the first and second seals 170a, 170b are fluid tight. Preferably, the first and second seals 170a, 170b are O-ring seals or another type of seal made of a synthetic rubber material, a thermoplastic material, or another suitable material. Alternatively, the first and second seals 170a, 170b may each comprise one or more seals adapted to fit within circumferential grooves 180 (see FIGS. 8A, 9A, 11A) of each tubesheet.

As shown in FIGS. 4A-6B, each assembly 100a, 100b, 100c further comprises a plurality of radial through openings 162 formed, in one embodiment, in one of the tubesheets 154a (see FIGS. 4A, 5A, 6A), and formed, in another embodiment, in each of the first and second tubesheets 154a, 154b (see FIGS. 4B, 5E, 6B). If the first tubesheet 154a has radial through openings 162, the radial through openings 162 are preferably formed in the body portion 160a of the first tubesheet 154a by cutting or drilling into the body portion 160a of the first tubesheet 154a around or along the circumference or perimeter 163 (see FIG. 6A) of the first tubesheet 160a. If the second tubesheet 154b has radial through openings 162, the radial through openings 162 are preferably formed in the body portion 160b of the second tubesheet 154b by cutting or drilling into the body portion 160b of the second tubesheet 154b around or along the circumference or perimeter 163 (see FIG. 6B) of the second tubesheet 160b. The radial through openings 162 preferably intersect or sever at least the exterior surface 150 (see FIG. 7B) and the interior surface 152 (see FIG. 7B) of each or substantially each of the hollow fiber membranes 142. The shape of the radial through openings 162 may be circular or round, elliptical, or another suitable shape.

FIGS. 4A, 5A-5D, and 6A show the embodiment of the fluid separation assembly 100a where only one tubesheet 154a has the radial through openings 162. As shown in FIG. 5A, the radial through openings 162 intersect the hollow fiber membranes 142 encapsulated by the first tubesheet 154a to form end 136, and the radial through openings 162 are open to the feed inlet port 114. Cutting or drilling the radial through openings 162 through the hollow fiber membranes 142 encapsulated by the first tubesheet 154a allows feed gas 60, preferably pressurized feed gas, access to the interiors of the hollow fiber membranes 142, and the feed gas 60 flows into the individual hollow fiber membranes 142 from the feed inlet port 114. The feed gas 60 is preferably introduced into the hollow fiber membranes 142 via the plurality of radial through openings 162 formed in the first tubesheet 154a. As shown in FIGS. 4A and 5D, the second tubesheet 154b has a plurality of non-radial through openings 50 that open through the second end 158b of the second tubesheet 154b and are open to the second end cap 112 and the non-permeate outlet port 126. The radial through openings 162 formed in one of the tubesheets 154a or 154b minimize pressure loads and bending moments or stress on the tubesheet 154a or 154b.

FIGS. 4B, 5E-5J, and 6B show the embodiments of the fluid separation assembly 100b, 100c where both the first tubesheet 154a and the second tubesheet 154b have the radial through openings 162 in a four opening pattern 164, discussed in detail below. As shown in FIG. 5E, the radial through openings 162 intersect the hollow fiber membranes 142 encapsulated by the first tubesheet 154a to form end 136, and the radial through openings 162 are open to the feed inlet port 114. Cutting or drilling the radial through openings 162 through the hollow fiber membranes 142 encapsulated by the first tubesheet 154a allows feed gas 60, preferably pressurized feed gas, access to the interiors of the hollow fiber membranes 142, and the feed gas 60 flows into the individual hollow fiber membranes 142 from the feed inlet port 114. The feed gas 60 is preferably introduced into the hollow fiber membranes 142 via the plurality of radial through openings 162 formed in the first tubesheet 154a. As shown in FIGS. 4B and 5E, the second tubesheet 154b also has a plurality of radial through openings 162 with a four opening pattern 164. The radial through openings 162 intersect the hollow fiber membranes 142 encapsulated by the second tubesheet 154b to form end 138, and the radial through openings 162 are open to the non-permeate outlet port 126 at the second end 138 of the hollow fiber bundle 134 that is encapsulated by the second tubesheet 154b. Cutting or drilling the radial through openings 162 through the hollow fiber membranes 142 encapsulated by the second tubesheet 154b allows non-permeate gas 62 or inert gas, such as nitrogen enriched air (NEA), to flow out of the individual hollow fiber membranes 142 and out through the non-permeate outlet port 126. The non-permeate gas 62 is preferably removed from the hollow fiber membranes 142 via the plurality of radial through openings 162 formed in the second tubesheet 154b. The radial through openings 162 intersect or sever the hollow fiber membranes 142 in the first and second tubesheets 154a, 154b, so that feed gas 60, permeate gas 64, and/or non-permeate gas 62 may be introduced into or removed from the hollow fiber membranes 142 via the plurality of radial through openings 162. The radial through openings 162 formed in each of the first and second tubesheets 154a, 154b minimize pressure loads and bending moments or stress on each of the first and second tubesheets 154a, 154b.

Thus, in one embodiment of the fluid separation assembly 100a (see FIG. 4A), the assembly 100a comprises a hollow fiber bundle 134 comprising a plurality of hollow fiber membranes 142, a first tubesheet 154a and a second tubesheet 154b encapsulating respective ends 136, 138 of the hollow fiber bundle 134, wherein one of the tubesheets 154a has a plurality of radial through openings 162 formed in the tubesheet 154a. The assembly 100a further comprises a housing 102 surrounding the hollow fiber bundle 134 and the first and second tubesheets 154a, 154b, the housing 102 having a feed inlet port 114, a permeate outlet port 120, and a non-permeate outlet port 126. The feed gas 60, permeate gas 64, or non-permeate gas 62 are introduced into or removed from the hollow fiber membranes 142 via the plurality of radial through openings 162 formed in the tubesheet 154a, such that the radial through openings 162 of the tubesheet 154a intersect each or substantially each of the hollow fiber membranes 142.

In another embodiment of the fluid separation assembly 100b (see FIG. 4B), the assembly 100b comprises a hollow fiber bundle 134 comprising a plurality of hollow fiber membranes 142, a first tubesheet 154a and a second tubesheet 154b encapsulating respective ends 136, 138 of the hollow fiber bundle 134, wherein at least one tubesheet 154a, and preferably both tubesheets 154a, 154b have a plurality of radial through openings 162 formed in the at least one tubesheet 154a or both tubesheets 154a, 154b. The radial through openings 162 are preferably in a repeating four opening pattern 162 comprising four openings 166 in a substantially square configuration 168. The assembly 100b further comprises a housing 102 surrounding the hollow fiber bundle 134 and the first and second tubesheets 154a, 154b, the housing 102 having a feed inlet port 114, a permeate outlet port 120, and a non-permeate outlet port 126. Feed gas 60, permeate gas 64, or non-permeate gas 62 are introduced into or removed from the hollow fiber membranes 142 via the plurality of radial through openings 162 formed in the at least one tubesheet 154a or both tubesheets 154a, 154b, such that the radial through openings 162 of the at least one tubesheet 154a or both tubesheets 154a, 154b intersect each or substantially each of the hollow fiber membranes 142. The feed inlet port 114 is in flow communication with at least a portion of the radial through openings 162 on the first tubesheet 154a, so that the feed gas 60 comprising air can flow into the intersected hollow fiber membranes 142. The non-permeate outlet port 126 is in flow communication with at least a portion of the radial through openings 162 on the second tubesheet 154b, so that the non-permeate gas 62 comprising nitrogen enriched air can flow out of the intersected hollow fiber membranes 142 and out of the housing 102. The permeate outlet port 120 is in flow communication with an interior 109 (see FIG. 7A) of the housing 102, so that the permeate gas 64 comprising one or more of oxygen, carbon dioxide, and water can permeate out of the intersected hollow fiber membranes 142 and out of the housing 102. The assembly may further comprise at least one first seal 170a adjacent the first tubesheet 154a and at least one second seal 170b adjacent the second tubesheet 154b, wherein the first and second seals 170a, 170b are fluid tight. The fluid separation assembly 100a, 100b, 100c is preferably part of an inert gas generating system 28 in a transport vehicle, such as an aircraft 10. The transport vehicle may also comprise an aerospace vehicle, a space launch vehicle, a rocket, a satellite, a rotorcraft, a watercraft, a boat, a ship, a train, an automobile, a truck, a bus, or another suitable transport vehicle.

The radial through openings 162 may be formed in varying patterns around or along the circumference or perimeter 163 of the tubesheet and radially through the tubesheet by cutting or drilling radially into the body portion of the tubesheet from the circumference or perimeter of the tubesheet. The pattern and spacing of the radial through openings 162 are selected so as to minimize the pressure load and bending moments or stress on the tubesheet and maximize the strength of the tubesheet. Moreover, the pattern and depth of the radial through openings 162 are selected depending on the diameter of the tubesheet and/or diameter of the housing of the fluid separation assembly. Preferably, the wind angle of the hollow fiber membranes 142 and the size and location of the radial through openings 162 are selected so that the radial through openings 162 intersect or sever all or substantially all of the hollow fiber membranes 142. More preferably, the wind angle of the hollow fiber membranes 142 and the size and location of the radial through openings 162 are selected so that the radial through openings 162 intersect or sever all of the hollow fiber membranes 142.

In one exemplary embodiment, as shown in FIG. 6A, one tubesheet 154a has a two opening pattern 176 of radial through openings 162 in rows of two openings that repeat around the circumference or perimeter 163 of the tubesheet 154a and radially through the tubesheet 154. As shown in FIG. 6A, the two opening pattern 176 is spaced evenly around the circumference 163 of the tubesheet 154a.

In another exemplary embodiment as shown in FIGS. 4B, 5E, 5I, 6B, 8A, 9A, the tubesheets 154a, 154b (FIG. 6B), tubesheet 154*c* (FIG. 8A), and tubesheet 154*d* (FIG. 9A) all have radial through openings 162 in a repeating four opening pattern 164 that comprises four spaced openings 166 that form a substantially square configuration 168. The four opening pattern 164 of radial through openings 162 repeats around the circumference or perimeter 163 of the tubesheet and radially through the tubesheet. Preferably, the four opening pattern 164 may be used with the fluid separation assembly 100*b*, 100*c* having the hollow fiber membranes 142 in the crisscross or helical configuration 172 (see FIGS. 5E, 5I).

FIG. 8A is an illustration of a side view of the exemplary embodiment of the tubesheet 154*c* that may be used in one of the embodiments of the fluid separation assembly 100*b*, 100*c* disclosed herein. FIG. 8A shows the repeating four opening pattern 164 of radial through openings 162 comprised of four spaced openings 166 that form a substantially square configuration 168. Preferably, the four opening pattern 164 shown in FIG. 8A has thirty-two (32) total radial through openings 162. As shown in FIG. 8A, the tubesheet 154*c* has a first end 156*c*, a second end 158*c*, and a body portion 160*c*. In this embodiment, tubesheet 154*c* further comprises a manifold or plenum 178 and further comprises grooves 180 in the first end 156*c* and the second end 158*c* of the tubesheet 154*c*. The manifold or plenum 178 is a space or open portion in the tubesheet 154*c* intended to contain a fluid, such as gas, that flows into and out of the radial through openings 162 at a positive pressure. Having the manifold or plenum 178 within the tubesheet 154*c* may also simplify the manufacture of the housing 102. The manifold or plenum may also be formed into the housing 102 to allow the fluid to flow from the inlet port 114 to the radial through openings 162. The grooves 180 may preferably be adapted to contain or hold one or more fluid tight seals 170*a*, 170*b* (see FIG. 4B), such as O-ring seals or another suitable seal. As discussed above, the O-ring seals or other suitable seals may preferably be made of a synthetic rubber material, a thermoplastic material, or another suitable material. FIG. 8B is an illustration of a cross-sectional view taken along lines 8B-8B of the tubesheet 154*c* of FIG. 8A. FIG. 8B shows the radial through openings 162, the manifold or plenum 178, and a central opening 182 formed longitudinally through the center of the tubesheet 154*c*. The radial through openings 162 formed in the tubesheet 154*c* minimize pressure loads and bending moments or stress on the tubesheet 154*c*. FIG. 8B further shows a spacing 195 of the radial through openings 162 which is preferably the maximum distance between each four opening pattern 164.

In another exemplary embodiment as shown in FIG. 9A, tubesheet 154*d* also has a four opening pattern 164 that comprises four spaced openings 166 that form a substantially square configuration 168. For example, tubesheet 154*d* has the four opening pattern 164 of radial through openings 162 that repeats around the circumference or perimeter 163 of the tubesheet 154*d* and radially through the tubesheet 154*d*. Preferably, this four opening pattern 164 of tubesheet 154*d* has twenty-four (24) total radial through openings 162, and each four opening pattern 164 of tubesheet 154*d* is spaced farther apart than each four opening pattern 164 in tubesheet 154*c* of FIG. 8A. FIG. 9A is an illustration of a side view of the exemplary embodiment of the tubesheet 154*d* that may be used in one of the embodiments of the fluid separation assembly 100*b*, 100*c* disclosed herein. As shown in FIG. 9A, the tubesheet 154*d* has a first end 156*d*, a second end 158*d*, and a body portion 160*d*. In this embodiment, tubesheet 154*d* further comprises the manifold or plenum 178 and further comprises grooves 180 in the first end 156*d* and the second end 158*d* of the tubesheet 154*d*. As discussed above, the manifold or plenum 178 is a space or open portion in the tubesheet 154*d* intended to contain a fluid, such as gas, that flows into and out of the radial through openings 162 at a positive pressure. Having the manifold or plenum 178 within the tubesheet 154*d* may also simplify the manufacture of the housing 102. The grooves 180 may preferably be adapted to contain or hold one or more fluid tight seals 170*a*, 170*b* (see FIG. 4B), such as O-ring seals or another suitable seal. As discussed above, the O-ring seals or other suitable seals may preferably be made of a synthetic rubber material, a thermoplastic material, or another suitable material. FIG. 9B is an illustration of a cross-sectional view taken along lines 9B-9B of the tubesheet 154*d* of FIG. 9A. FIG. 9B shows the radial through openings 162, the manifold or plenum 178, and the central opening 182 formed longitudinally through the center of the tubesheet 154*d*. The radial through openings 162 formed in the tubesheet 154*d* minimize pressure loads and bending moments or stress on the tubesheet 154*d*.

Figure 10A:
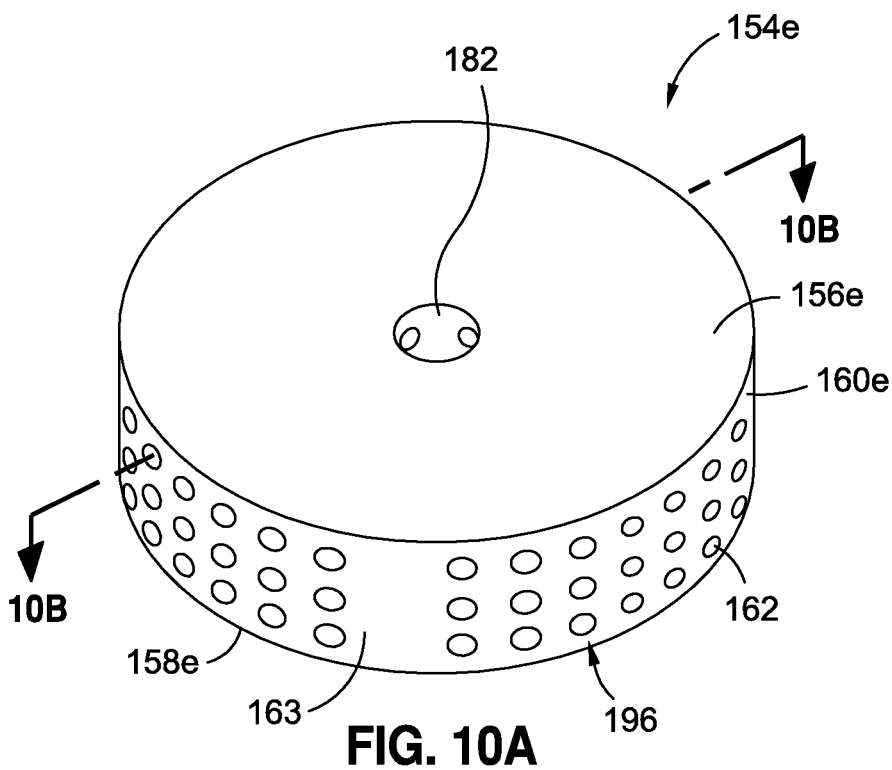
FIG. 10A is an illustration of a perspective view of another one of the embodiments of a tubesheet that may be used in one of the embodiments of the fluid separation assembly of the disclosure.
Figure 10B:
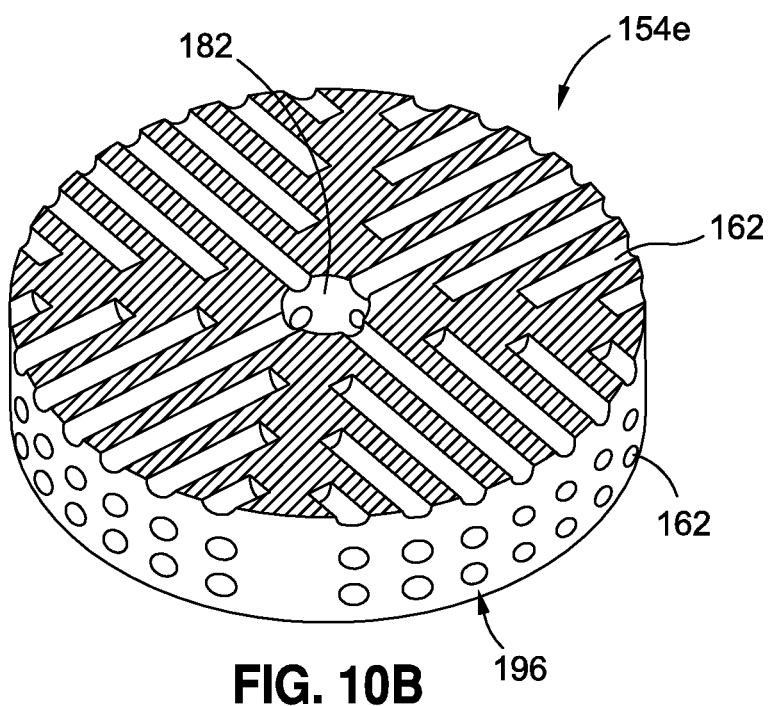
FIG. 10B is an illustration of a cross-sectional view taken along lines 10B-10B of FIG. 10A.

In another exemplary embodiment as shown in FIG. 10A, tubesheet 154*e* has a three opening pattern 196 of radial through openings 162 in rows of three openings that repeat around the circumference or perimeter 163 of the tubesheet 154*e* and radially through the tubesheet 154*e*. FIG. 10A is an illustration of a perspective view of the exemplary embodiment of the tubesheet 154*e* that may be used in one of the embodiments of the fluid separation assembly 100*a* disclosed herein. As shown in FIG. 10A, the tubesheet 154*e* has a first end 156*e*, a second end 158*e*, and a body portion 160*e*. FIG. 10B is an illustration of a cross-sectional view taken along lines 10B-10B of the tubesheet 154*e* of FIG. 10A. FIG. 10B shows the radial through openings 162 and the central opening 182 formed longitudinally through the center of the tubesheet 154*e*. The radial through openings 162 formed in the tubesheet 154*e* minimize pressure loads and bending moments or stress on the tubesheet 154*e*.

Figure 11B:
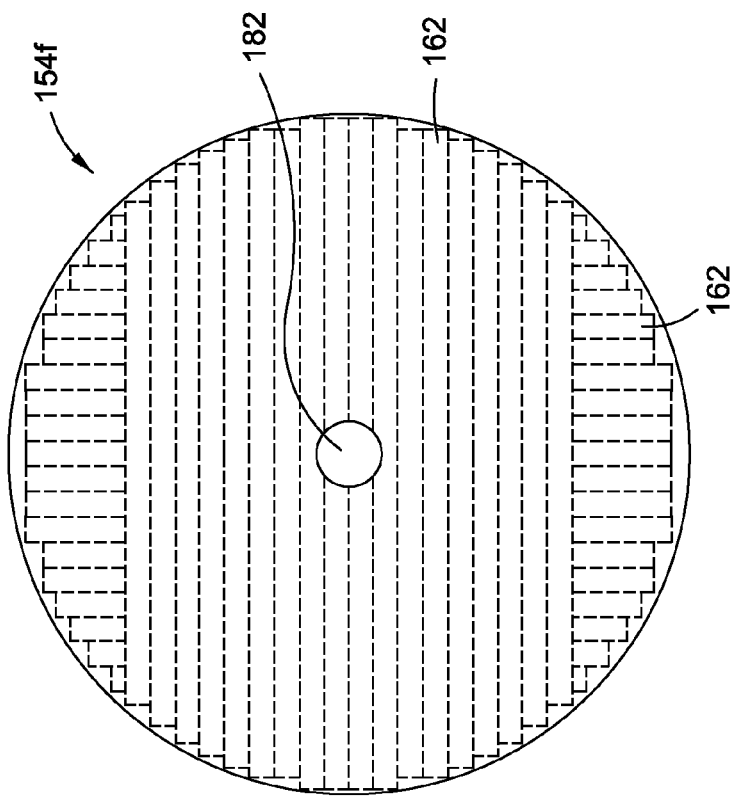
FIG. 11B is an illustration of a cross-sectional view taken along lines 11B-11B of FIG. 11A.
Figure 11A:
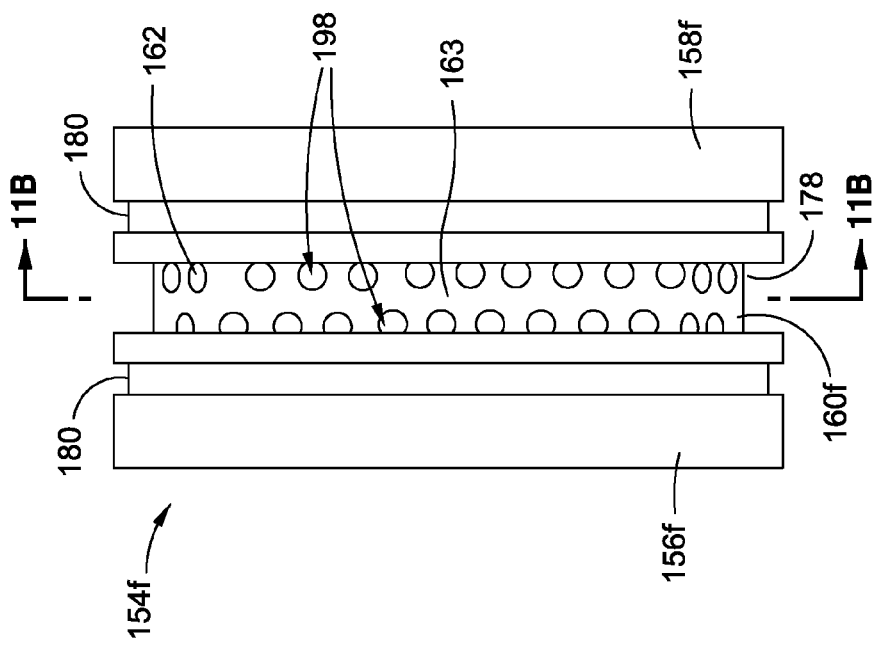
FIG. 11A is an illustration of a perspective view of another one of the embodiments of a tubesheet that may be used in one of the embodiments of the fluid separation assembly of the disclosure.

In another exemplary embodiment as shown in FIG. 11A, tubesheet 154*f* has an alternating row pattern 198 of two or more rows of radial through openings 162 around the circumference or perimeter of the tubesheet 154*f*. FIG. 11A is an illustration of a perspective view of the exemplary embodiment of the tubesheet 154*f* that may be used in one of the embodiments of the fluid separation assembly 100*a* disclosed herein, preferably having the hollow fiber membranes 142 in the parallel configuration 174 (see FIG. 6A). As shown in FIG. 11A, the tubesheet 154*f* has a first end 156*f*, a second end 158*f*, and a body portion 160*f*. In this embodiment, tubesheet 154*f* further comprises the manifold or plenum 178 and further comprises grooves 180 in the first end 156*f* and the second end 158*f* of the tubesheet 154*f*. As discussed above, the manifold or plenum 178 is a space or open portion in the tubesheet 154*f* intended to contain a fluid, such as gas, that flows into and out of the radial through openings 162 at a positive pressure. Having the manifold or plenum 178 within the tubesheet 154*f* may also simplify the manufacture of the housing 102. The grooves 180 may preferably be adapted to contain or hold one or more fluid tight seals 170*a*, 170*b* (see FIG. 4A), such as O-ring seals or another suitable seal. As discussed above, the O-ring seals or other suitable seals may preferably be made of a synthetic rubber material, a thermoplastic material, or another suitable material. FIG. 11B is an illustration of a cross-sectional view taken along lines 11B-11B of the tubesheet 154*f* of FIG. 11A. FIG. 11B shows the radial through openings 162 and the central opening 182 formed longitudinally through the center of the tubesheet 154*f*. The radial through openings 162 formed in the tubesheet 154*f* minimize pressure loads and bending moments or stress on the tubesheet 154*f*.

Figure 12C:
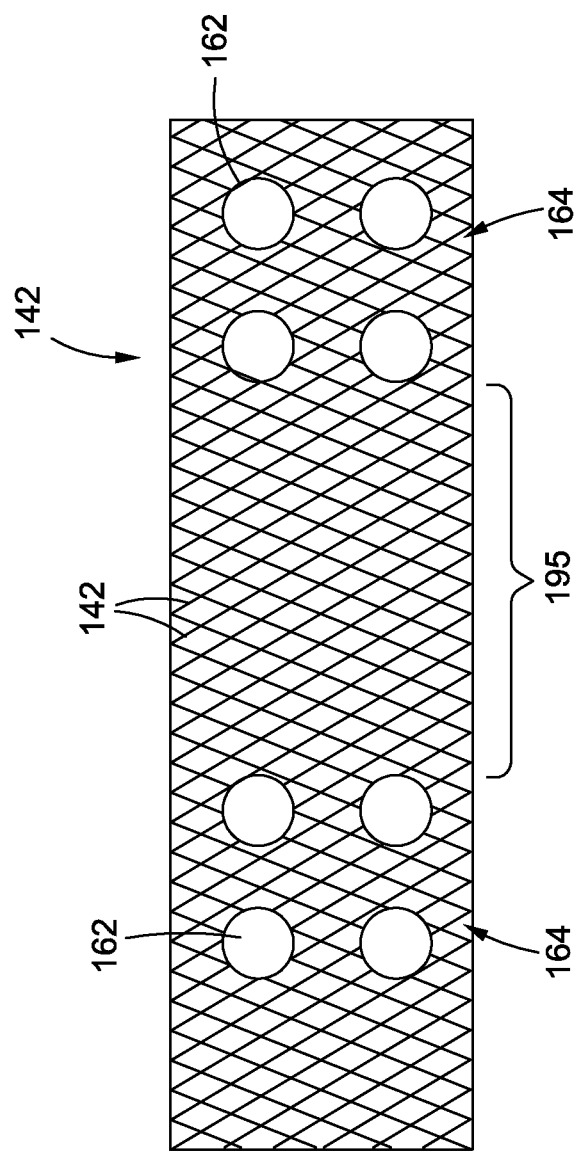
FIG. 12C is an illustration of spacing between the four opening pattern of radial through openings of FIG. 12A.

In particular, the four opening pattern 164 of radial through openings 162 has several advantages. FIG. 12A is an illustration of the four opening pattern 164 comprising four spaced openings 166 that form a substantially square configuration 168. FIG. 12B is an illustration of a one opening pattern 188 comprising a single opening 190. FIG. 12C is an illustration of spacing 195 between the four opening pattern 164 of radial through openings 162 of FIG. 12A. A comparison was made between the four opening pattern 164 and the one opening pattern 188. It was found that the four openings 166 of the four opening pattern 164 intersected or opened as many hollow fiber membranes as the single opening 190 which was four (4) times the diameter size of each opening 166 with only a minimal amount of the tubesheet material being removed in order to form the four openings 166. Dotted lines 184 (see FIG. 11A) represent the hollow fiber membranes the four smaller openings 166 intersected or opened, and dotted lines 192 (see FIG. 11B) represent the hollow fiber membranes the single opening 190 intersected or opened. There are several advantages of the four opening pattern 164. For example, the four opening pattern 164 intersects or opens substantially all of the hollow fiber membranes. In addition, the smaller openings 166 of the four opening pattern 164 allows for more of the tubesheet material to support a load on the tubesheet. Once the hollow fiber membranes are intersected or opened, the high pressure feed gas or supply air may enter the hollow fiber membranes so the separation process can take place. When the overall opening pattern size is smaller, for example, dimension A 186 (see FIG. 12A) is smaller than dimension B 194 (see FIG. 12B), and such smaller opening pattern size allows for increased manufacturing tolerance in a distance between the openings 166. Moreover, the tubesheet may be smaller in size with the four opening pattern 164, and the overall weight of the tubesheet and fluid separation assembly may be decreased. Thus, the four opening pattern 164 maintains the strength of the material while minimizing the size of the tubesheet. The size of the openings 166 and the spacing of the openings 166 may be dependent on the thickness and diameter of the tubesheet and the wind angle of the hollow fiber membranes 142 and the diameter of the hollow fiber bundle 134. The four openings 166 in the substantially square configuration 168 of the four opening pattern 164 may vary depending on the thickness and diameter of the tubesheet and the wind angle of the hollow fiber membranes 142. FIG. 12C shows that the four radial through openings 162 of each four opening pattern 164 intersect all of the hollow fiber membranes 142 that are in the area of each of the four radial through openings 162. This allows the next or subsequent four opening pattern 164 to be spaced farther apart from the preceding four opening pattern 164. FIG. 12C shows the spacing 195 between the four opening patterns 164. (FIG. 8B also shows the spacing 195 of the radial through openings 162 which is preferably the maximum distance between each four opening pattern 164.) The area below the radial through openings 162 (where the opening stops) may have the maximum distance between openings.

The flow of fluid through embodiments of the fluid separation assembly disclosed herein may be carried out in various ways depending on the embodiment of the fluid separation assembly used. FIG. 7A is an illustration of a side view in partial cross-section showing fluid flow through the radial through openings 162 of one of the embodiments of the fluid separation assembly 100b of the disclosure. As shown in FIG. 7A, the radial through openings 162 may be intersected by a longitudinal central opening 182 that may run parallel to the length of the hollow fiber bundle 134. FIG. 7B is an illustration of an enlarged side view in partial cross-section showing fluid flow through an individual hollow fiber membrane 142 of the fluid separation assembly 100b of FIG. 7A. As shown in FIG. 7B, the radial through openings 162 intersect or sever an exterior surface 150 and an interior surface 152 of the hollow fiber membrane 142, so that the feed fluid or gas 60, preferably air or high pressure air, can flow into the intersected hollow fiber membrane 142 and proceed into the hollow fiber membrane 142 and down the length of the hollow fiber membrane 142. FIG. 7A shows feed gas 60 entering through the feed inlet port 114. The feed inlet port 114 is in flow communication with at least a portion of the radial through openings 162 on the first tubesheet 154a, so that the feed gas 60 can flow into each or substantially each of the intersected hollow fiber membranes 142. Instead of entering the hollow fiber membranes 142 through, for example, end 156a (see FIG. 156a) of the tubesheet 154a, the feed gas 60 is channeled around the circumference or perimeter 163 of the tubesheet 154a and enters the radial through openings 162 along the circumference or perimeter 163 of the tubesheet 154a and radially through the tubesheet 154a. Preferably, the feed fluid or gas 60 comprises air, high pressure air, natural gas, flue gas or another suitable feed fluid or gas.

As the high pressure feed gas 60 progresses down the length of the intersected hollow fiber membranes 142, permeate fluid or gas 64 of oxygen enriched waste gas or air molecules, which may comprise non-nitrogen waste or exhaust gas. Preferably, the permeate fluid or gas 64 comprises one or more of oxygen ($O_2$), carbon dioxide ($CO_2$), and/or water ($H_2O$); or methane or another suitable permeate fluid or gas. The permeate gas 64 may permeate through walls 153 (see FIG. 7B) of the hollow fiber membranes 142 and through the exterior surface 150 (see FIG. 7B) of the hollow fiber membranes 142 to the low pressure permeate outlet port 120 (see FIG. 7A) and may be exhausted overboard. FIG. 7A shows permeate gas 64 permeating out of the hollow fiber membranes 142 and out through the permeate outlet port 120. The permeate outlet port 120 is in flow communication with an interior 109 of the housing 102, so that the permeate gas 64 can permeate out of the exterior surface 150 of the hollow fiber membranes 142 and out of the housing 102.

As the high pressure feed gas 60 progresses down the length of the hollow fiber membranes 142, non-permeate fluid or gas 62, such as nitrogen molecules, continues down the length of the hollow fiber membranes 142 until they reach the radial through openings 162 of the second tubesheet 154b. The non-permeate fluid or gas 62 preferably comprises nitrogen enriched air (NEA), nitrogen, nitrogen oxide, carbon monoxide, sulfur oxide, or another suitable non-permeate fluid or gas. The non-permeate gas 62 or inert gas, for example, nitrogen enriched air (NEA), may be collected and flows through the radial through openings 162 of the second tubesheet 154b and out through the non-permeate outlet port 126 where the nitrogen enriched air may be used in the inert gas generating system 28 and the fuel tank 26 (see FIG. 1). FIG. 7A shows non-permeate gas 62 flowing out of the intersected hollow fiber membranes 142 into the radial through openings 162 and out through the non-permeate outlet port 126. The non-permeate outlet port 126 is in flow communication with at least a portion of the radial through openings 162 on the second tubesheet 154b, so that the non-permeate gas 62 can flow out of each or substantially each of the intersected hollow fiber membranes 142 and out of the housing 102.

Preferably, the fluid separation assembly 100a, 100b, 100c is part of an inert gas generating system 28 (see FIG. 1) in a transport vehicle, such as an aircraft 10. The transport vehicle may also comprise an aerospace vehicle, a space launch vehicle, a rocket, a satellite, a rotorcraft, a watercraft, a boat, a ship, a train, an automobile, a truck, a bus or another suitable transport vehicle. As discussed above, embodiments of the fluid separation assembly in accordance with the disclosure may also be utilized in non-vehicle applications, such as portable ground support applications, medical applications, food storage applications, purification of natural gas applications, VOC removal applications, dehumidification applications, and other suitable non-vehicle applications.

In another embodiment of the disclosure, there is provided an aircraft 10 (see FIG. 1) comprising an airframe or fuselage 12, at least one fuel tank 26 mounted on the airframe or fuselage 12, at least one fuel tank vent 27 operatively connected to the fuel tank 26, and an inert gas generating system 28 for generating inert gas on-board the aircraft 10. The inert gas generating system 28 preferably includes a fluid separation assembly 100a, 100b, 100c, as discussed above, and preferably the fluid separation assembly is in the form of a gas separation assembly. The fluid separation assembly, preferably in the form of the gas separation assembly, comprises a hollow fiber bundle 134 comprising a plurality of hollow fiber membranes 142. The fluid separation assembly, preferably in the form of the gas separation assembly, further comprises a first tubesheet 154a and a second tubesheet 154b encapsulating respective ends 136, 138 of the hollow fiber bundle 134, wherein one of the tubesheets 154a has a plurality of radial through openings 162 formed in the tubesheet 154a. The fluid separation assembly, preferably in the form of the gas separation assembly, further comprises a housing 102 surrounding the hollow fiber bundle 134 and the first and second tubesheets 154a, 154b. The housing 102 has a feed inlet port 114, a permeate outlet port 120, and a non-permeate outlet port 126. Feed gas 60, permeate gas 64, or non-permeate gas 62 may be introduced into or removed from the hollow fiber membranes 142 via a plurality of radial through openings 162 formed in the tubesheet 154a, such that the radial through openings 162 of the tubesheet 154a intersect each or substantially each of the hollow fiber membranes 142. As discussed above, the radial through openings 162 may preferably be formed in a repeating four opening pattern 164 comprising four openings 166 in a substantially square configuration 168. The fluid separation assembly, preferably in the form of the gas separation assembly, is preferably part of an inert gas generating system 28 in a transport vehicle, such as an aircraft 10. The transport vehicle may further comprise an aerospace vehicle, a space launch vehicle, a rocket, a satellite, a rotorcraft, a watercraft, a boat, a ship, a train, an automobile, a truck, and a bus, or another suitable transport vehicle.

Figure 13:
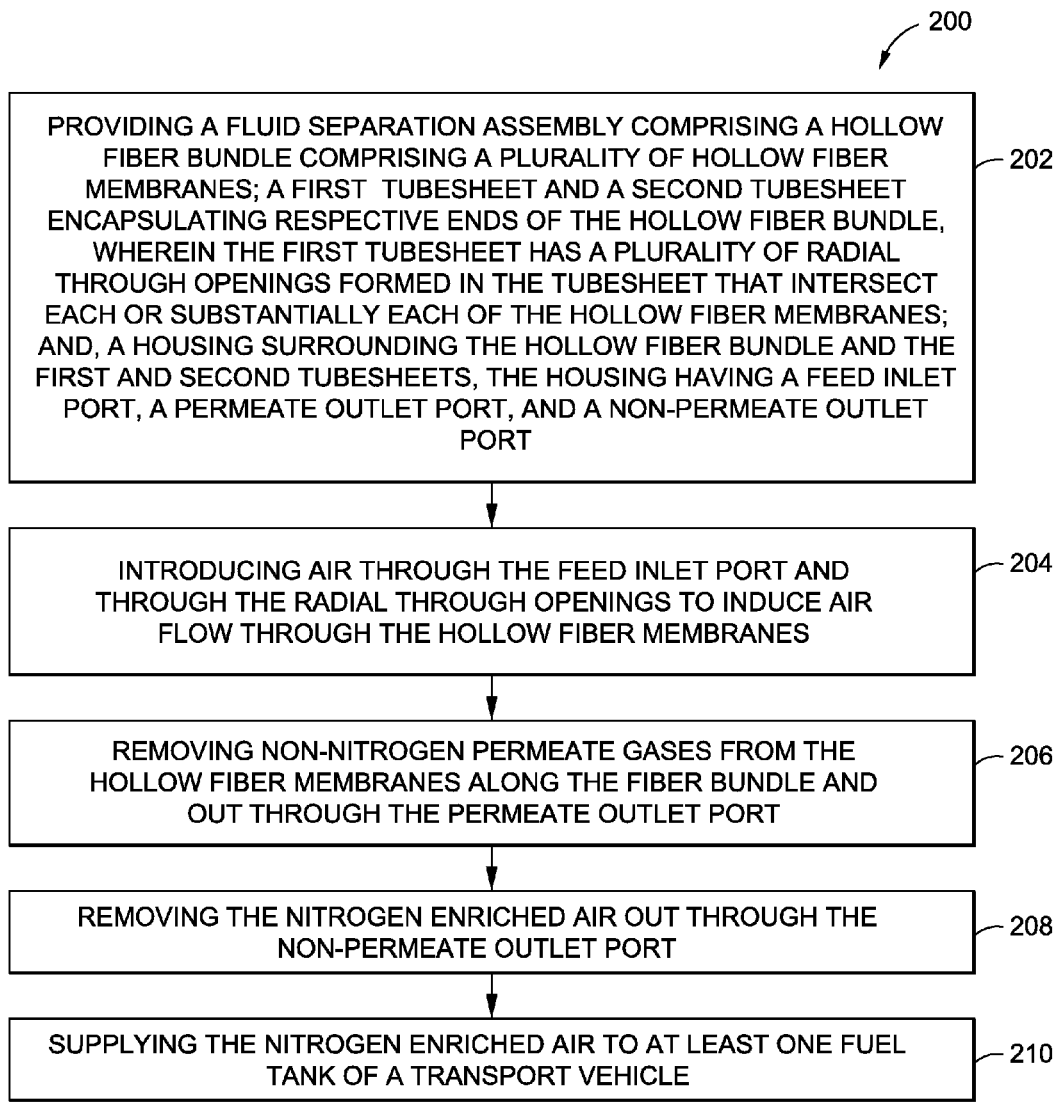
FIG. 13 is a flow diagram illustrating one of the embodiments of a method of the disclosure.

In another embodiment of the disclosure, there is provided a method 200 for supplying non-permeate gas 62 or inert gas, such as nitrogen enriched air, from a fluid separation assembly 100a, 100b, 100c to at least one fuel tank 26 (see FIG. 1) of a transport vehicle such as an aircraft 10 (see FIG. 1). FIG. 13 is a flow diagram illustrating one of the embodiments of the method 200 of the disclosure. The method 200 comprises step 202 of providing the fluid separation assembly 100a (see FIG. 5A), 100b (see FIG. 5E), 100c (see FIG. 5I) as discussed above. The fluid separation assembly 100a, 100b, 100c, as discussed above, comprises a hollow fiber bundle 134 comprising a plurality of hollow fiber membranes 142. As discussed above, the fluid separation assembly 100a, 100b, 100c further comprises a first tubesheet 154a and a second tubesheet 154b encapsulating respective ends 136, 138 of the hollow fiber bundle 134, wherein the first tubesheet 154a has a plurality of radial through openings 162 formed in the first tubesheet 154a that intersect each or substantially each of the hollow fiber membranes 142. Alternatively, each of the two tubesheets 154a, 154b have radial through openings 162 formed in a repeating four opening pattern 164 comprising four openings 166 in a substantially square configuration 168 (see FIG. 6B). As discussed above, the fluid separation assembly 100a, 100b, 100c further comprises a housing 102 surrounding the hollow fiber bundle 134 and the first and second tubesheets 154a, 154b. The housing 102 preferably has a feed inlet port 114, a permeate outlet port 120, and a non-permeate outlet port 126.

The method 200 further comprises step 204 of introducing feed gas 60, such as air, and preferably pressurized air, through the feed inlet port 114 and through the radial through openings 162 to induce air flow, preferably pressurized air flow, through the hollow fiber membranes 142 (see FIG. 5A, 5E). The method 200 further comprises step 206 of removing non-nitrogen permeate gases 64, such as one or more of oxygen, carbon dioxide, and/or water, from the hollow fiber membranes 142 along the hollow fiber bundle 134 and out through the permeate outlet port 120 (see FIG. 5A, 5E). The method 200 further comprises step 208 of removing non-permeate gas 62, such as nitrogen enriched air, out through the non-permeate outlet port 126 (see FIG. 5A, 5E). The method 200 further comprises step 210 of supplying the non-permeate gas 62, such as the nitrogen enriched air, to at least one fuel tank 26 (see FIG. 1) of a transport vehicle such as an aircraft 10 (see FIG. 1).

Figure 14:
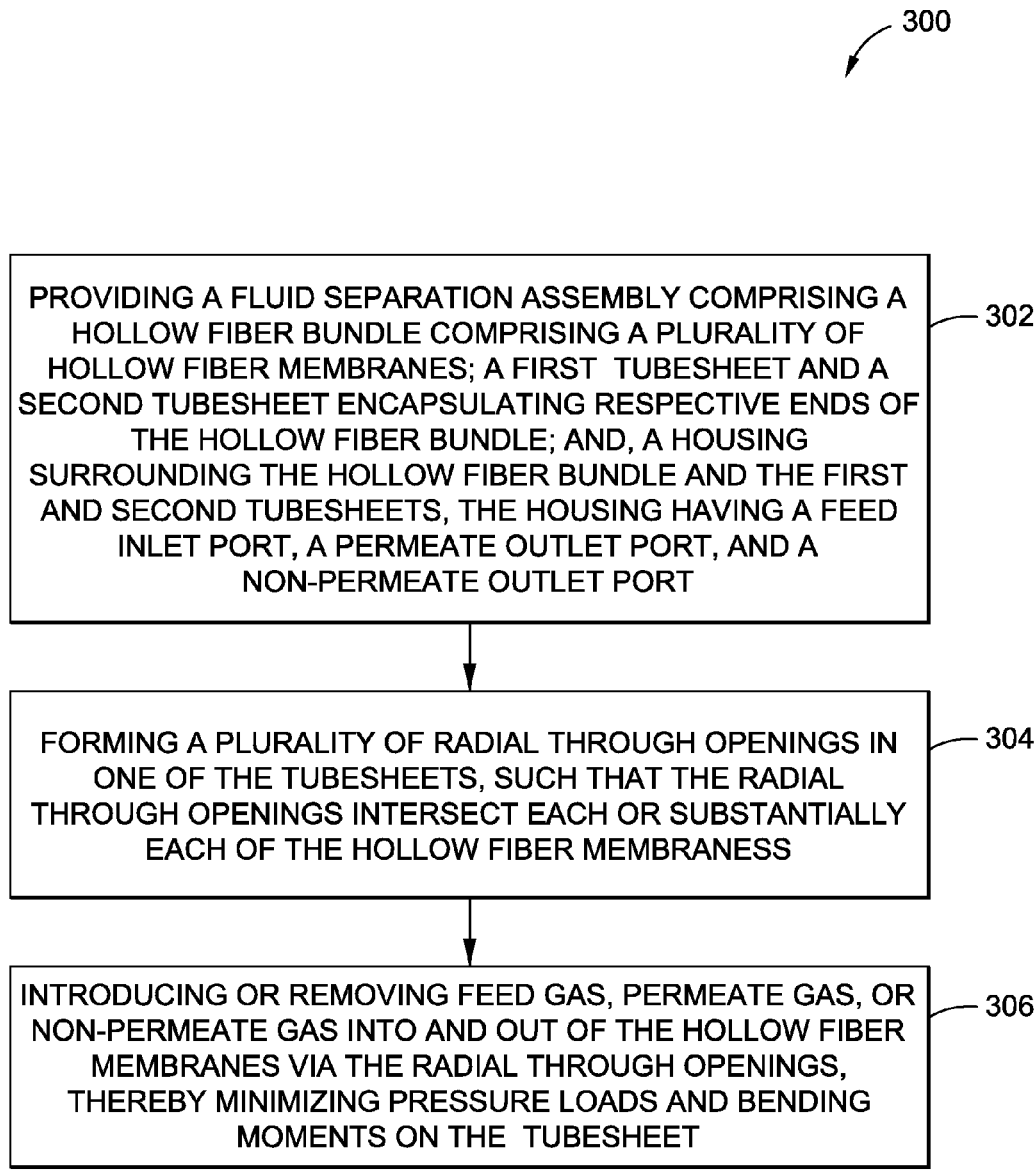
FIG. 14 is a flow diagram illustrating another one of the embodiments of a method of the disclosure; and, FIG. 15 is a flow diagram illustrating yet another one of the embodiments of a method of the disclosure.

In another embodiment of the disclosure, there is provided a method 300 for minimizing pressure loads and bending moments in the fluid separation assembly 100a, 100b, 100c. FIG. 14 is a flow diagram illustrating one of the embodiments of another method 300 of the disclosure. The method 300 comprises step 302 of providing a fluid separation assembly 100a (see FIG. 5A), 100b (see FIG. 5E), 100c (see FIG. 5I). As discussed above, the fluid separation assembly 100a, 100b, 100c comprises a hollow fiber bundle 134 comprising a plurality of hollow fiber membranes 142. As discussed above, the fluid separation assembly 100a, 100b, 100c further comprises a first tubesheet 154a and a second tubesheet 154b encapsulating respective ends 136, 138 of the hollow fiber bundle 134. As discussed above, the fluid separation assembly 100a, 100b, 100c further comprises a housing 102 surrounding the hollow fiber bundle 134 and the first and second tubesheets 154a, 154b. The housing 102 has a feed inlet port 114, a permeate outlet port 120, and a non-permeate outlet port 126.

The method 300 further comprises step 304 of forming a plurality of radial through openings 162 (for example, see FIGS. 4A-11B) in, for example, one of the tubesheets 154a or 154b or in one of the tubesheets 154c (see FIG. 8A), 154d (see FIG. 9A), 154e (see FIG. 10A), 154f (see FIG. 11A), or another suitable tubesheet. The radial through openings 162 intersect or sever at least an exterior surface 150 (see FIG. 7B) and an interior surface 152 (see FIG. 7B) of each or substantially each of the hollow fiber membranes 142.

The method 300 further comprises step 306 of introducing or removing feed gas 60, permeate gas 64, or non-permeate gas 62 (for example, see FIGS. 4A and 7A) into and out of the hollow fiber membranes 142 via the radial through openings 162, thereby minimizing pressure loads and bending moments on, for example, the first tubesheet 154a or on tubesheet 154c or another suitable tubesheet. The feed gas 60 may preferably comprise air or pressurized air, the non-permeate gas 62 may preferably comprise nitrogen enriched air, and the permeate gas 64 may preferably comprise one or more non-nitrogen permeate gases such as oxygen, carbon dioxide, and/or water. The fluid separation assembly 100a, 100b, 100c is preferably part of an inert gas generating system 28 in a transport vehicle, such as an aircraft 10. The transport vehicle may also comprise an aerospace vehicle, a space launch vehicle, a rocket, a satellite, a rotorcraft, a watercraft, a boat, a ship, a train, an automobile, a truck, and a bus, or another suitable transport vehicle.

Figure 15:
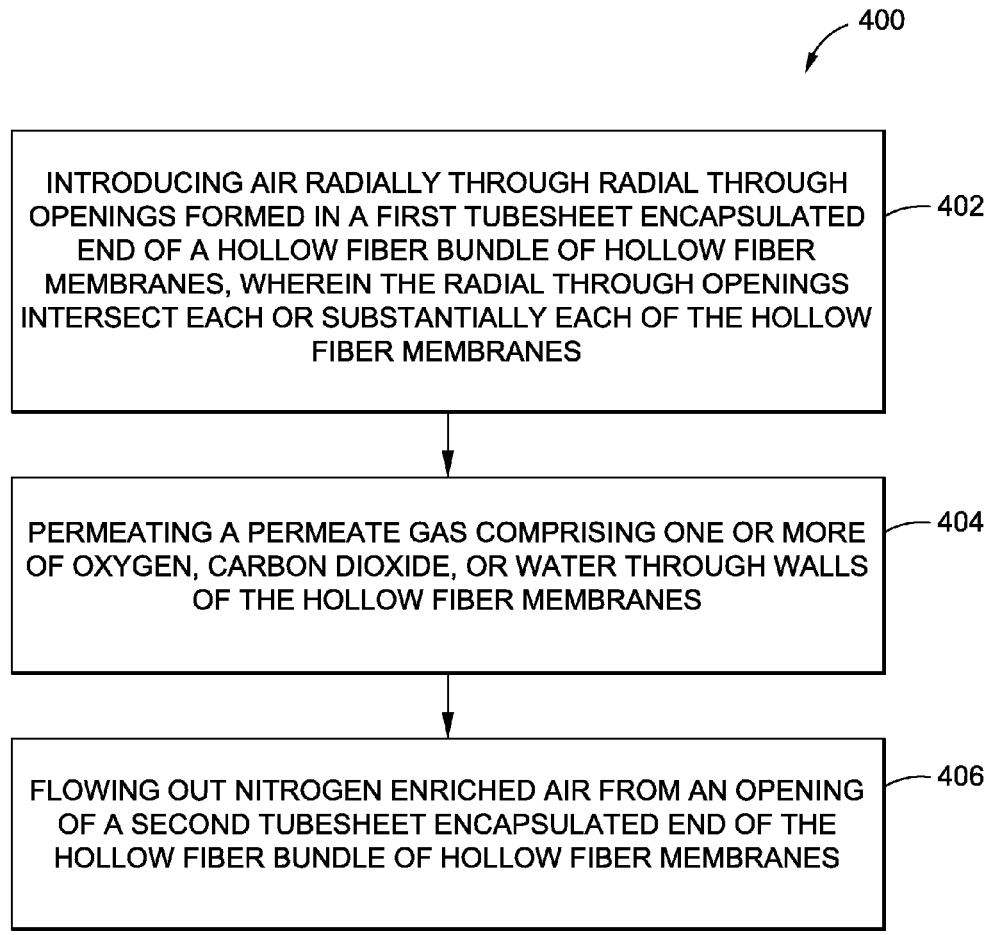

In another embodiment of the disclosure, there is provided a method 400 for generating nitrogen enriched air. FIG. 15 is a flow diagram illustrating one of the embodiments of the method 400 of the disclosure. The method 400 comprises step 402 of introducing feed gas 60, such as air, and preferably pressurized high temperature air, radially through radial through openings 162 formed in a first tubesheet 154*a* encapsulated end 136 of a hollow fiber bundle 134 of hollow fiber membranes 142. The radial through openings 162 preferably intersect each or substantially each of the hollow fiber membranes 142. The radial through openings 162 may be formed in a repeating four opening pattern 164 comprising four openings 166 in a substantially square configuration. 168.

The method 400 further comprises step 404 of permeating a permeate gas 64 comprising one or more of oxygen, carbon dioxide, and water, through walls of the hollow fiber membranes 142. The method 400 further comprises step 406 of flowing out non-permeate gas 62, such as nitrogen enriched air, from an opening of a second tubesheet 154*b* encapsulated end 138 of the hollow fiber bundle 134 of hollow fiber membranes 142. The opening of the second tubesheet 154*b* may comprise through openings 50 formed in the second end 158*b* of the second tubesheet 154*b* or the opening of the second tubesheet 154*b* may comprise radial through openings 162 formed in the circumference or perimeter 163 of the second tubesheet 154*b*.

Embodiments of the fluid separation assembly 100*a*, 100*b*, 100*c* and methods 200, 300, 400 provide a fluid separation assembly with a radial feed design that allows feed gas 60, such as air, to enter the circumference or perimeter 163 of, for example, a first tubesheet 154*a* via a plurality of radial through openings 162 rather than through a potted end or face 48 of the tubesheet 46 as in existing designs (see FIG. 2A). The high pressure feed gas 60 that flows through the openings in the potted end or face 48 of such existing potted end design can place pressure and compression loads on the end or face 48 of the tubesheet and wear the material of the tubesheet down over time. The novel radial feed design of the tubesheet of the disclosed fluid separation assembly can easily handle such pressure and compression load on the tubesheet 154*a*, and thus the fluid separation assembly 100*a*, 100*b*, 100*c* and methods 200, 300, 400 may minimize or eliminate pressure loads and bending moments or bending stresses on the tubesheet. The radial feed design thus eliminates the need for the tubesheet to be a pressure boundary. Therefore, the tubesheet will not have bending moments placed on it and will have a longer service life. By minimizing or eliminating the stresses associated with a pressure boundary, disclosed embodiments of the fluid separation assembly may operate at their most optimum temperature and pressure for a desired application. Moreover, since the tubesheet is typically the life-limiting component of the fluid separation assembly, by extending the service life of the tubesheet, this may, in turn, extend the service life of the fluid separation assembly. This may result in increased reliability of the fluid separation assembly, and in turn, increased reliability of the transport vehicle, such as an aircraft, reduced maintenance costs of the transport vehicle, and reduced overall weight of the transport vehicle. A benefit of the radial feed design is that the inlet pressure can be increased to reduce the fluid separation assembly or air separation module size and weight without a decrease in the fluid separation assembly or air separation module ASM life, or in other words, the fluid separation assembly or air separation module life can be increased while maintaining the same inlet pressure and therefore the fluid separation assembly or air separation module size and weight.

In addition, the fluid separation assembly 100*a*, 100*b*, 100*c* and methods 200, 300, 400 provide a radial feed design that increases the efficiency of the hollow fiber membranes 142 which may produce more non-permeate gas or inert gas, such as nitrogen enriched air, as the radial feed design may operate at higher temperatures, and higher temperatures may increase the efficiency of the separation of nitrogen and oxygen. The nitrogen enriched air provided by embodiments of the fluid separation assembly and methods of the disclosure can be supplied to at least one fuel tank of a transport vehicle, such as an aircraft.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A fluid separation assembly comprising:
   a hollow fiber bundle comprising a plurality of hollow fiber membranes;
   a first tubesheet and a second tubesheet encapsulating respective ends of the hollow fiber bundle, wherein one or both of the first and second tubesheets has a plurality of radial through openings formed in one or both of the first and second tubesheets; and,
   a housing surrounding the hollow fiber bundle and the first and second tubesheets, the housing having a feed inlet port, a permeate outlet port, and a non-permeate outlet port;
   wherein feed gas, permeate gas, or non-permeate gas are introduced into or removed from the hollow fiber membranes via the plurality of radial through openings formed in one or both of the first and second tubesheets, and further wherein the radial through openings of one or both of the first and second tubesheets are formed along a circumference of and radially through a body portion of one or both of the first and second tubesheets, and intersect each or substantially each of the hollow fiber membranes.

2. The assembly of claim 1, further comprising at least one first seal adjacent the first tubesheet and at least one second seal adjacent the second tubesheet, wherein the first and second seals are fluid tight.

3. The assembly of claim 1, wherein the housing further comprises a first end cap and a second end cap, wherein the first and second end caps are closed.

4. The assembly of claim 1, wherein the feed inlet port is in flow communication with at least a portion of the radial through openings on the first tubesheet, so that the feed gas can flow into the intersected hollow fiber membranes.

5. The assembly of claim 1, wherein the non-permeate outlet port is in flow communication with the second tubesheet, so that the non-permeate gas can flow out of the hollow fiber membranes and out of the housing.

6. The assembly of claim 1, wherein the permeate outlet port is in flow communication with an interior of the housing, so that the permeate gas can permeate out of the intersected hollow fiber membranes and out of the housing.

7. The assembly of claim 1, wherein the feed gas comprises air, the non-permeate gas comprises nitrogen enriched air, and the permeate gas comprises one or more of oxygen, carbon dioxide, and water.

8. The assembly of claim 1, wherein the radial through openings are formed in a repeating four opening pattern comprising four openings in a substantially square configuration.

9. The assembly of claim 1, wherein the radial through openings minimize pressure loads and bending moments on the tubesheet.

10. The assembly of claim 1, wherein the assembly is part of an inert gas generating system in a transport vehicle, wherein the transport vehicle is selected from the group comprising an aircraft, an aerospace vehicle, a space launch vehicle, a rocket, a satellite, a rotorcraft, a watercraft, a boat, a ship, a train, an automobile, a truck, and a bus.

11. A fluid separation assembly comprising:
a hollow fiber bundle comprising a plurality of hollow fiber membranes;
a first tubesheet and a second tubesheet encapsulating respective ends of the hollow fiber bundle, wherein at least one tubesheet has a plurality of radial through openings formed in the at least one tubesheet, the radial through openings being in a repeating four opening pattern comprising four openings in a substantially square configuration; and,
a housing surrounding the hollow fiber bundle and the first and second tubesheets, the housing having a feed inlet port, a permeate outlet port, and a non-permeate outlet port;
wherein feed gas, permeate gas, or non-permeate gas are introduced into or removed from the hollow fiber membranes via the plurality of radial through openings formed in the at least one tubesheet, and further wherein the radial through openings of the at least one tubesheet are formed along a circumference of and radially through a body portion of the at least one tubesheet, and intersect each or substantially each of the hollow fiber membranes.

12. The assembly of claim 11, wherein both the first tubesheet and the second tubesheet have radial through openings.

13. The assembly of claim 11, wherein the feed inlet port is in flow communication with at least a portion of the radial through openings on the first tubesheet, so that the feed gas comprising air can flow into the intersected hollow fiber membranes.

14. The assembly of claim 11, wherein the non-permeate outlet port is in flow communication with at least a portion of the radial through openings on the second tubesheet, so that the non-permeate gas comprising nitrogen enriched air can flow out of the intersected hollow fiber membranes and out of the housing.

15. The assembly of claim 11, wherein the permeate outlet port is in flow communication with an interior of the housing, so that the permeate gas comprising one or more of oxygen, carbon dioxide, and water can permeate out of the intersected hollow fiber membranes and out of the housing.

16. The assembly of claim 11, wherein the housing further comprises a first end cap and a second end cap, wherein the first and second end caps are closed.

17. The assembly of claim 11, further comprising at least one first seal adjacent the first tubesheet and at least one second seal adjacent the second tubesheet, wherein the first and second seals are fluid tight.

18. The assembly of claim 11, wherein the assembly is part of an inert gas generating system in a transport vehicle wherein the transport vehicle is selected from the group comprising an aircraft, an aerospace vehicle, a space launch vehicle, a rocket, a satellite, a rotorcraft, a watercraft, a boat, a ship, a train, an automobile, a truck, and a bus.

19. An aircraft comprising:
an airframe;
at least one fuel tank mounted on the airframe;
at least one fuel tank vent operatively connected to the fuel tank; and,
an inert gas generating system for generating inert gas on-board the aircraft, the inert gas generating system comprising:
a gas separation assembly comprising:
a hollow fiber bundle comprising a plurality of hollow fiber membranes;
a first tubesheet and a second tubesheet encapsulating respective ends of the hollow fiber bundle, wherein one or both of the first and second tubesheets has a plurality of radial through openings formed in one or both of the first and second tubesheets; and,
a housing surrounding the hollow fiber bundle and the first and second tubesheets, the housing having a feed inlet port, a permeate outlet port, and a non-permeate outlet port;
wherein feed gas, permeate gas, or non-permeate gas are introduced into or removed from the hollow fiber membranes via the plurality of radial through openings formed in one or both of the first and second tubesheets, and further wherein the radial through openings of one or both of the first and second tubesheets are formed along a circumference of and radially through a body portion of one or both of the first and second tubesheets, and intersect each or substantially each of the hollow fiber membranes.

20. The aircraft of claim 19, wherein the radial through openings are formed in a repeating four opening pattern comprising four openings in a substantially square configuration.

21. A method for supplying nitrogen enriched air from a fluid separation assembly to at least one fuel tank of a transport vehicle, the method comprising:
providing a fluid separation assembly comprising:
a hollow fiber bundle comprising a plurality of hollow fiber membranes;
a first tubesheet and a second tubesheet encapsulating respective ends of the hollow fiber bundle, wherein the first tubesheet has a plurality of radial through openings formed along a circumference of and radially through a body portion of the first tubesheet, and that intersect each or substantially each of the hollow fiber membranes; and,
a housing surrounding the hollow fiber bundle and the first and second tubesheets, the housing having a feed inlet port, a permeate outlet port, and a non-permeate outlet port;
introducing air through the feed inlet port and through the radial through openings to induce air flow through the hollow fiber membranes;
removing non-nitrogen permeate gases from the hollow fiber membranes along the fiber bundle and out through the permeate outlet port;
removing nitrogen enriched air out through the non-permeate outlet port; and,
supplying the nitrogen enriched air to at least one fuel tank of a transport vehicle.

22. The method of claim 21, wherein the radial through openings are formed in a repeating four opening pattern comprising four openings in a substantially square configuration.

23. A method for minimizing pressure loads and bending moments in a fluid separation assembly, the method comprising:
- providing a fluid separation assembly comprising:
  - a hollow fiber bundle comprising a plurality of hollow fiber membranes;
  - a first tubesheet and a second tubesheet encapsulating respective ends of the hollow fiber bundle; and,
  - a housing surrounding the hollow fiber bundle and the first and second tubesheets, the housing having a feed inlet port, a permeate outlet port, and a non-permeate outlet port;
- forming a plurality of radial through openings in one or both of the first and second tubesheets, wherein the radial through openings are formed along a circumference of and radially through a body portion of one or both of the first and second tubesheets, and intersect each or substantially each of the hollow fiber membranes; and,
- introducing or removing feed gas, permeate gas, or non-permeate gas into and out of the hollow fiber membranes via the radial through openings, thereby minimizing pressure loads and bending moments on one or both of the first and second tubesheets.

24. The method of claim 23, wherein the radial through openings are formed in a repeating four opening pattern comprising four openings in a substantially square configuration.

\* \* \* \* \*